(12) United States Patent
Clark et al.

(10) Patent No.: US 12,024,364 B2
(45) Date of Patent: Jul. 2, 2024

(54) CONTAINER-MANOEUVRING APPARATUS

(71) Applicant: OCADO INNOVATION LIMITED, Hatfield (GB)

(72) Inventors: Sean Clark, Hatfield (GB); Joseph Zammit, Hatfield (GB); Ben Thomas, Hatfield (GB); Andrew John Ingram-Tedd, Hatfield (GB); Matthew Whelan, Hatfield (GB); David Sharp, Hatfield (GB); Paul Clarke, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 437 days.

(21) Appl. No.: 17/293,758

(22) PCT Filed: Nov. 11, 2019

(86) PCT No.: PCT/EP2019/080887
§ 371 (c)(1),
(2) Date: May 13, 2021

(87) PCT Pub. No.: WO2020/099332
PCT Pub. Date: May 22, 2020

(65) Prior Publication Data
US 2022/0009710 A1  Jan. 13, 2022

(30) Foreign Application Priority Data

| Nov. 14, 2018 | (GB) | ..................................... | 1818543 |
| Nov. 14, 2018 | (GB) | ..................................... | 1818595 |
| Apr. 5, 2019 | (GB) | ..................................... | 1904827 |

(51) Int. Cl.
*B65G 1/04* (2006.01)
*B65G 1/02* (2006.01)
*B65G 1/137* (2006.01)

(52) U.S. Cl.
CPC ........... *B65G 1/0464* (2013.01); *B65G 1/026* (2013.01); *B65G 1/0414* (2013.01); *B65G 1/1375* (2013.01)

(58) Field of Classification Search
CPC .... B65G 1/0464; B65G 1/026; B65G 1/0414; B65G 1/1375
See application file for complete search history.

(56) References Cited

U.S. PATENT DOCUMENTS

| 2013/0276665 A1 | 10/2013 | Dalrymple |
| 2016/0060037 A1 | 3/2016 | Razumov |

(Continued)

FOREIGN PATENT DOCUMENTS

| EP | 3375734 A1 | 9/2018 |
| GB | 2520104 A | 5/2015 |

(Continued)

OTHER PUBLICATIONS

DP World: "Introducing DP World Cargospeed—The future of freight transportation", YouTube, Apr. 29, 2018, 3 pages.

(Continued)

*Primary Examiner* — Kaitlin S Joerger
(74) *Attorney, Agent, or Firm* — BUCHANAN INGERSOLL & ROONEY PC

(57) ABSTRACT

There is provided a container maneuvering apparatus arranged to provide an interface between a container-conveying system and a container-storage system. More specifically, there is disclosed a container maneuvering apparatus arranged to load/unload a container into/from a carriage. Optionally, the carriage is a Magway carriage. The carriage can be made stationary before loading/unloading the container by the container-conveying system. The carriage and container can match velocities so that both are moving, but at the same velocity, whilst loading/unloading (Continued)

operations are performed by the container maneuvering apparatus.

13 Claims, 22 Drawing Sheets

(56) References Cited

U.S. PATENT DOCUMENTS

| | | | |
|---|---|---|---|
| 2016/0160853 A1 | 6/2016 | Dalrymple | |
| 2016/0229416 A1 | 8/2016 | Bambrogan et al. | |
| 2016/0229417 A1 | 8/2016 | Bambrogan et al. | |
| 2016/0229418 A1 | 8/2016 | Bambrogan et al. | |
| 2016/0229419 A1 | 8/2016 | Bambrogan et al. | |
| 2016/0229646 A1 | 8/2016 | Bambrogan et al. | |
| 2016/0230350 A1 | 8/2016 | Bambrogan et al. | |
| 2017/0334312 A1 | 11/2017 | Zhou | |
| 2019/0009984 A1* | 1/2019 | Hognaland | B65G 47/57 |
| 2019/0135555 A1 | 5/2019 | Wagner et al. | |
| 2019/0300301 A1 | 10/2019 | Bambrogan et al. | |
| 2020/0148470 A1* | 5/2020 | Austrheim | B65G 1/0492 |
| 2020/0343118 A1* | 10/2020 | Torazawa | B65G 1/0492 |
| 2021/0130091 A1* | 5/2021 | Austrheim | B61B 13/00 |
| 2021/0188545 A1* | 6/2021 | Hognaland | B65G 1/0464 |
| 2021/0198038 A1* | 7/2021 | Enenkel | B65G 1/0478 |
| 2021/0206573 A1* | 7/2021 | Enenkel | B07C 5/36 |
| 2021/0221618 A1* | 7/2021 | Austrheim | B65G 47/02 |
| 2021/0229911 A1* | 7/2021 | Austrheim | G05D 1/0291 |
| 2021/0229912 A1* | 7/2021 | Austrheim | B65G 1/0414 |
| 2022/0009710 A1* | 1/2022 | Clark | B65G 1/0414 |
| 2022/0177223 A1* | 6/2022 | Heggebø | B61B 13/02 |
| 2022/0281684 A1* | 9/2022 | Fjeldheim | B65G 1/0464 |
| 2022/0332507 A1* | 10/2022 | Boer | B65G 1/0464 |
| 2022/0340361 A1* | 10/2022 | Fagerland | B65G 1/065 |
| 2023/0065714 A1* | 3/2023 | Austrheim | B65G 1/0464 |

FOREIGN PATENT DOCUMENTS

| | | | | |
|---|---|---|---|---|
| WO | 9849075 A1 | 11/1998 | | |
| WO | WO-2014090684 A1 * | 6/2014 | | B65G 1/0407 |
| WO | 2014195901 A1 | 12/2014 | | |
| WO | 2015019055 A1 | 2/2015 | | |
| WO | 2015185628 A2 | 12/2015 | | |
| WO | 2017201435 A1 | 11/2017 | | |
| WO | 2017220651 A1 | 12/2017 | | |
| WO | 2018233886 A1 | 12/2018 | | |
| WO | 2019086237 A1 | 5/2019 | | |

OTHER PUBLICATIONS

Examination Report and Basis of the Examination issued in Patent Application No. GB1916433.4 dated Feb. 26, 2021.
GB Search Report issued in corresponding Patent Application No. GB1904827.1 dated Oct. 3, 2019.
International Search Report (PCT/ISA/210) and Written Opinion (PCT/ISA/237) dated Apr. 6, 2020, by the European Patent Office as the International Searching Authority for International Application No. PCT/EP2019/080887.
Magway: Magway | Delivery Utility | Delivering the Future Today, YouTube, Aug. 10, 2018. 3 pages.
Office Action dated Sep. 9, 2022, by the Canadian Patent Office in corresponding Canadian Patent Application No. 3, 119,813. (7 pages).
Office Action (Examination Report No. 1) dated Jul. 7, 2022, by the Australian Patent Office in corresponding Australian Patent Application No. 2019380566. (4 pages).
Office Action (Examination report No. 2 for standard patent application) dated Jan. 6, 2023, by the Australian Government, IP Australia in corresponding Australian Patent Application No. 2019380566. (2 pages).
Office Action (Combined Search and Examination Report) dated Oct. 21, 2021, by the Great Britain Patent Office in corresponding Great Britain Patent Application No. GB2112624.8. (5 pages).
Office Action dated Nov. 29, 2023, by the Canadian Patent Office in corresponding Canadian Patent Application No. 3,119,813. (4 pages).

* cited by examiner

CONTAINER-MANOEUVRING APPARATUS

This application claims priority from UK Patent Application No. 1818543.9 filed 14 Nov. 2018, the content of all this application hereby being incorporated by reference.

This application also claims priority from UK Patent Application No. 1818595.9 filed 14 Nov. 2018, the content of all this application hereby being incorporated by reference.

This application also claims priority from UK Patent Application No. 1904827.1 filed 5 Apr. 2019, the content of all this application hereby being incorporated by reference.

TECHNICAL FIELD

The present invention relates generally to the field of container manipulation and more specifically to an apparatus and method for manoeuvring containers in to and out of carriages for container movement.

BACKGROUND

A container, a tote or a box may be used in many applications as means for storage and/or for transporting items. Containers may for example be used in warehouse environments to store items and/or for subsequent delivery of said items to customers. Containers may therefore need to be transported from one location to another, e.g. from a storage location to a delivery location or vice versa. Similarly, containers may need to be moved from a first storage location to a second storage location.

However, depending on the distance across which a container is to be transported will be a factor used to determine the transportation means employed. For example, containers transported within a single building or between buildings at the same facility may use conveyor belts or other similar conveying means. This may be particularly the case within warehouse environments, where containers may be moved by the conveying means from one area where the containers are filled to another area where the containers are stored.

For longer distances other conveying means are typically employed. For example, containers may be loaded onto container-frames, which are wheeled trolleys or dollies that are arranged to carry a container or containers. The container-frames may then be loaded onto lorries, vans, trains etc. for transportation to a distant location. In this example, a storage facility may be required to transport stored containers to a delivery facility distantly located. Therefore, the containers may be transported on lorries, vans, trains etc. using container-frames.

Alternatively, multiple conveying means may be used for the transportation of containers to distant locations. For example, the storage facility may be arranged to extract containers to be transported to a destination facility. The extracted containers may be placed on conveyor belts to move them from storage facility to an egress point (i.e. a point at which containers leave a conveyor or other conveying means). At the egress point, the containers may be loaded onto container-frames for relocation on to lorries, vans, trains etc.

Similarly, at the destination, the container-frames may be unloaded from the lorries, vans, trains etc. and removed from container-frames to be placed onto a conveyor belt at a conveyor ingress point (i.e. a point at which containers enter a conveyor or other conveying means).

Recently Magway have proposed distributing containers via carriages located inside relatively small diameter pipe to reduce reliance on lorries, vans, trains etc. The pipe can be buried, elevated or run above ground. In the Magway implementation containers are transported individually on individual carriages rather than together on a lorry, van, train etc. Magway proposes using linear synchronous motors in a track to propel each carriage. In this way, a carriage can be passive and instead only the track needs to be powered to provide locomotion.

FIG. 1 depicts an example transportation system as would be implemented by Magway. In particular, FIG. 1 shows a carriage 2 arranged to transport a container 10. The carriage comprises a body 21. The body 21 is envisaged to fully encompass the sides of the container 10 and/or partially encompass the sides of the container 10. For example, the body 21 may be implemented as a tray upon which the container 10 rests. Moreover, the body 21 may further comprise a lid to cover a top of the container 10.

The carriage 2 is arranged to interface with a track (not shown) where the track is arranged to provide the locomotive force required to propel the carriage 2. The carriage is shown with optional wheels 23 which may interface with a track (not shown) although other technologies such as linear motors are envisaged. The use of track and wheels may help the stability of the carriage 2 and/or provide guidance for the carriage. The track and wheels may provide a locomotive force for the carriage 2 and/or a linear motor may be used to provide the locomotive force. Optionally, the track may be a captive track in that it prevents wheels from leaving the track which provides additional benefits with regard to guiding the carriage on the track.

Moreover, the carriage 2 is arranged to operate within a pipe 3. Magway suggests that a pipe be of a diameter comparable with that of utilities such as gas, water or sewer pipes and not comparable with larger pipe such as underground trains. In this way, Magway pipes may be more easily implemented in urban areas because the pipes are of a smaller diameter. In particular, urbans areas are commonly congested—both above and below ground. Therefore, the use of smaller diameter pipes helps with the routing of pipes in these congested spaces. Additionally, the use of equipment and processes required to implement underground piping is widely available, well understood and used for the implementation of utilities such as electricity, water and gas piping.

Magway, as with lorries, vans, trains etc., involves the labour intensive process of loading and unloading containers from each carriage. There is therefore a need to further automate the process of moving containers from a storage facility onto a conveying means for travel to another location.

SUMMARY

In view of the problems in known manual container loading/unloading processes, the present invention aims to provide an apparatus and method to automate the loading/unloading of containers onto/from a carriage as quickly as possible whilst reducing risk of damage to items within the container.

In general terms, the invention introduces automated container manoeuvring for the movement of containers on/off static carriages or moving carriages.

The present invention provides a container-manoeuvring apparatus arranged to provide an interface between a container-conveying means and a container-storage system.

The present invention also provides a system comprising a container-manoeuvring apparatus as previously described, a container-conveying means and a container-storage system.

The present invention also provides a container-manoeuvring method comprising manoeuvring a container between container-conveying means and a container-storage system.

The present invention also provides a non-transitory computer-readable storage medium comprising instructions which, when executed by a computer, cause performance of the method as previously described.

The present invention also provides a magnetic container-conveying means arranged to receive a container from a container-storage system and to convey the container to a location, and to convey a container from the location to the container-storage system.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

Generally, the first and second embodiments disclosed herein provide a container-manoeuvring apparatus, which provides an interface between container-conveying means and a container-storage system. The container-conveying means may for example take the form of a magnetic container-conveying means and the container-storage system may for example take the form of a container storage and retrieval system comprising a grid in which a plurality of containers may be stored and a plurality of robots may be configured to retrieve containers from the grid.

First Embodiment

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 2 to 5 of the accompanying drawings.

Figure 2:
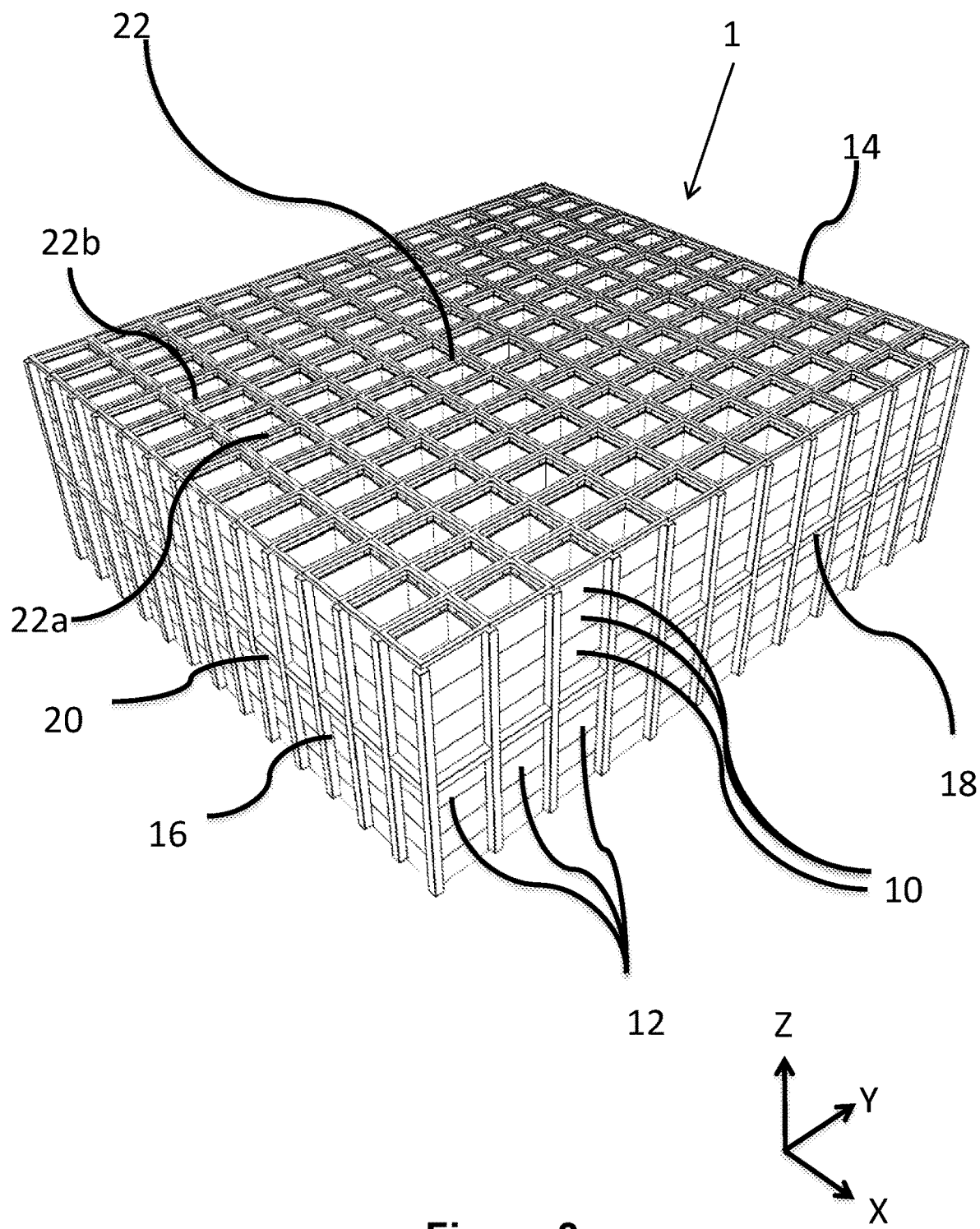
FIG. 2 is a schematic diagram of a framework structure according to a known system.
Figure 3:
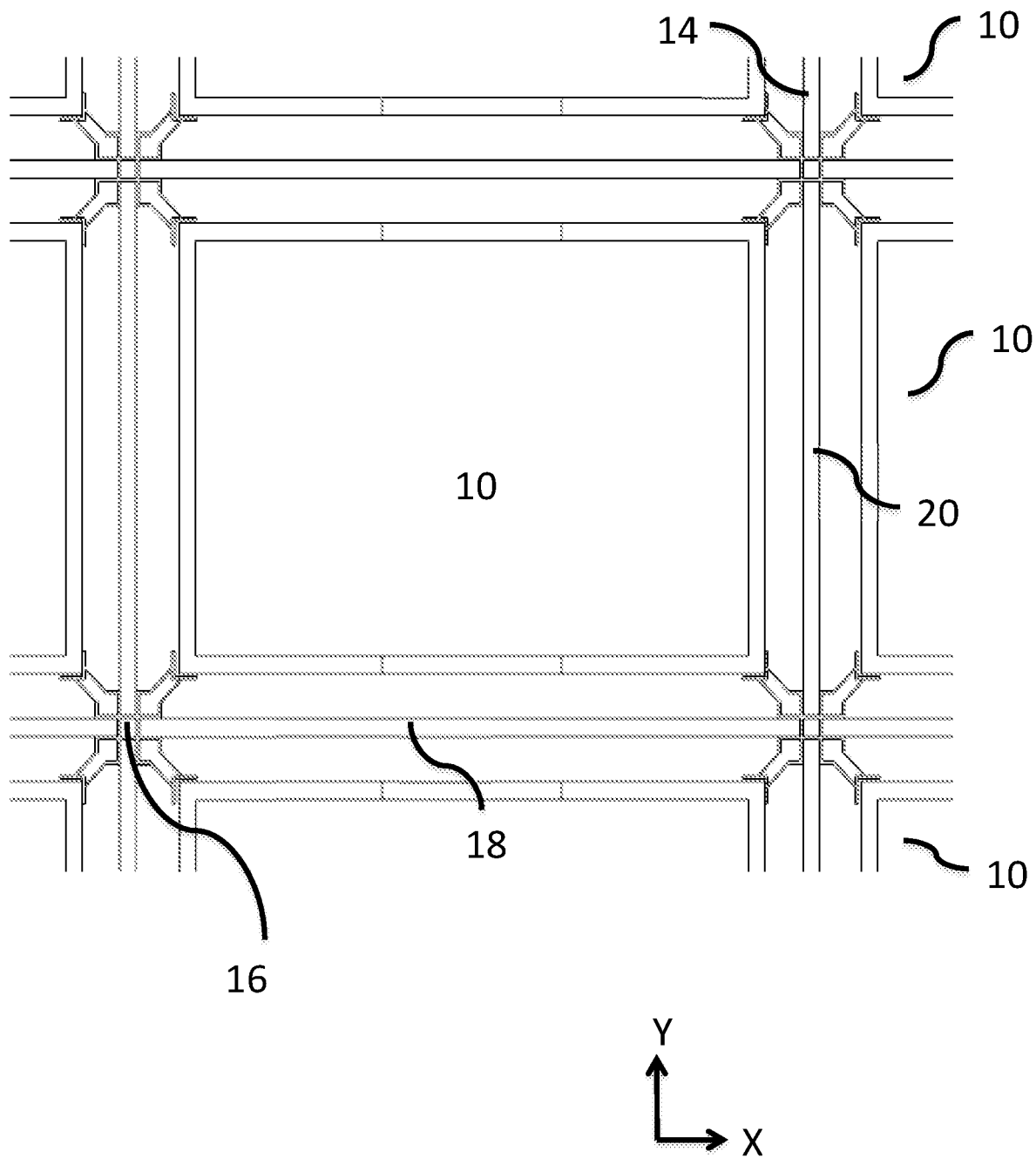
FIG. 3 is a schematic diagram of a top-down view showing a stack of bins arranged within the framework structure of FIG. 2.

As shown in FIGS. 2 and 3, stackable containers, known as bins 10 (it is envisaged that the term "bin" may be used interchangeably with the term "container" and/or "tote"), are stacked on top of one another to form stacks 12. The stacks 12 are arranged in a grid framework structure 14 in a warehousing or manufacturing environment. FIG. 2 is a schematic perspective view of the framework structure 14, and FIG. 3 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 4C:
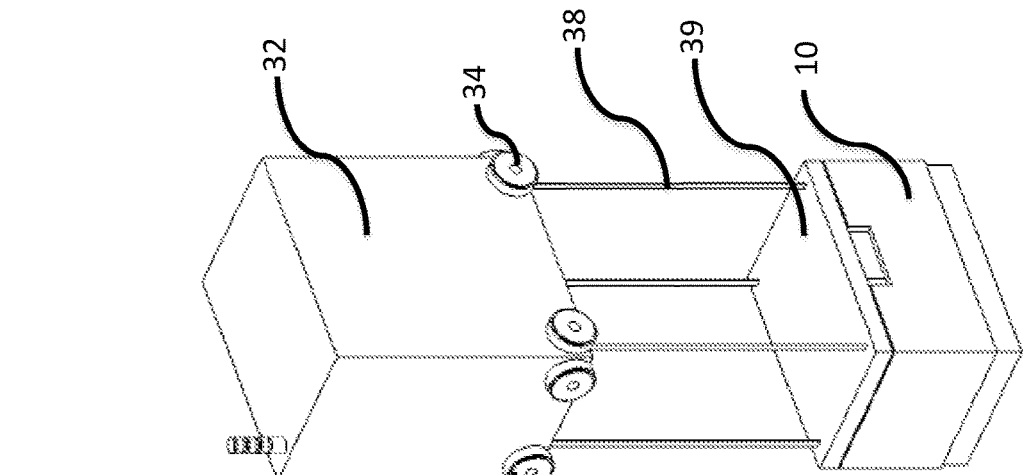
FIGS. 4(a) and 4(b) are schematic perspective views of a load handling device depositing a bin and FIG. 4(c) is a schematic front perspective view of a load handling device lifting a bin.
Figure 4B:
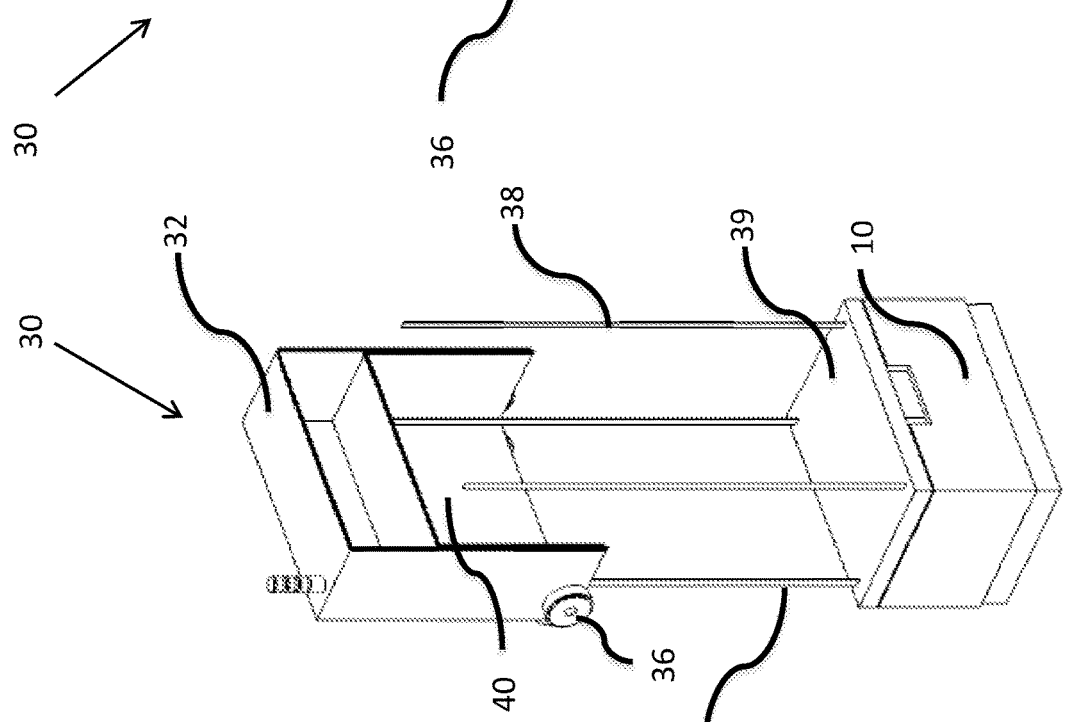
Figure 4A:
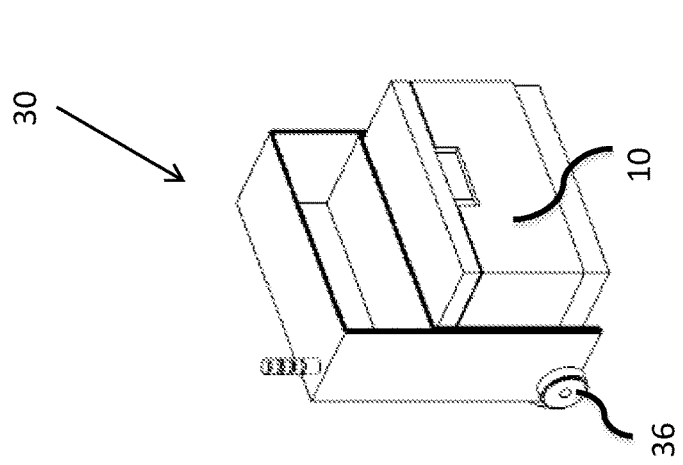
Figure 5:
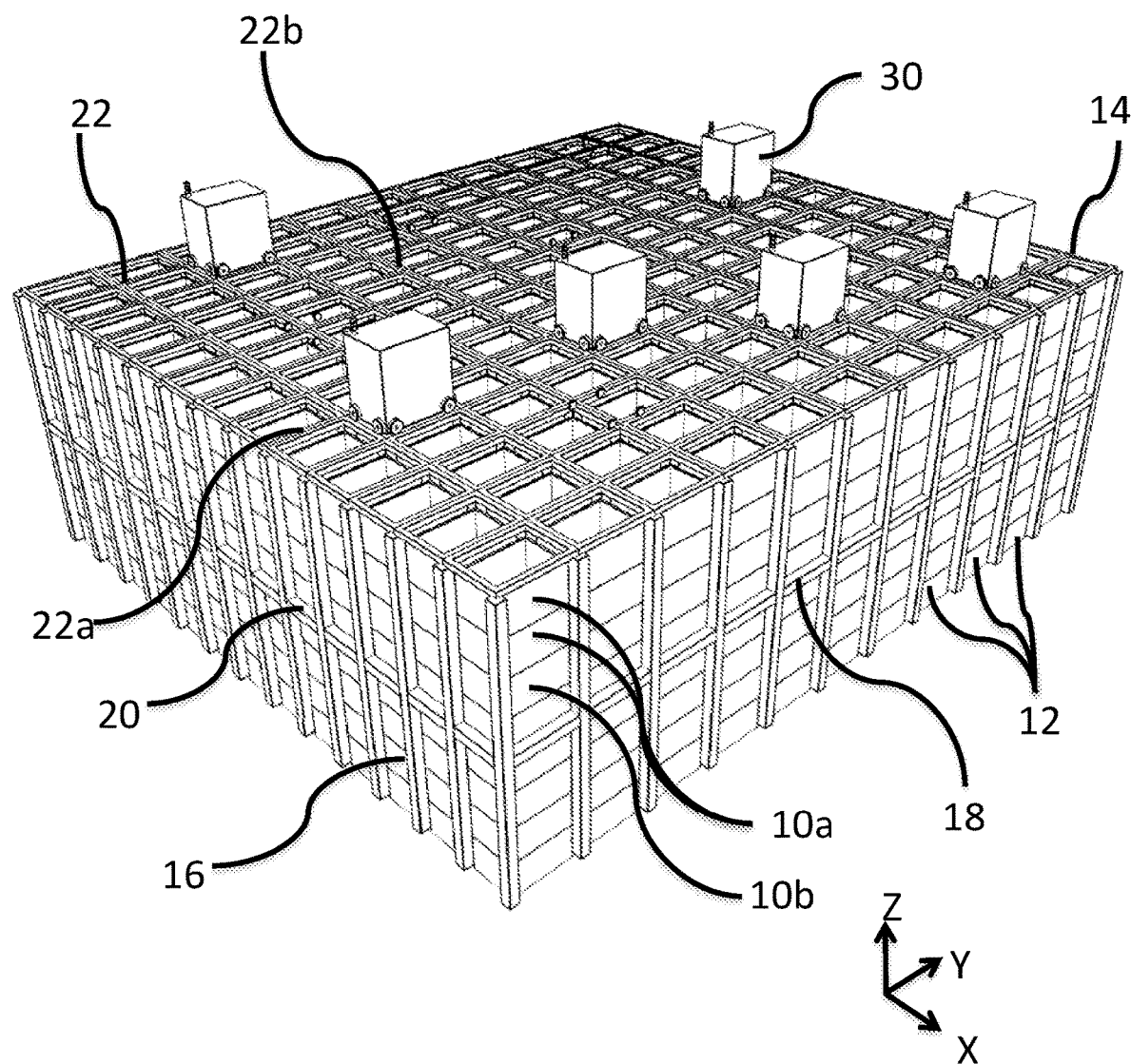
FIG. 5 is a schematic diagram of a system showing load handling devices operating on the framework structure.

The top level of the frame structure 14 includes rails 22 arranged in a grid pattern across the top of the stacks 12. Referring additionally to FIGS. 4 and 5, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 4(a) and 4(b) are schematic cross sectionals views of a load handling device 30 depositing a bin 10, and FIG. 4(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 4(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The weight of the vehicle 32 may be comprised in part of batteries that are used to power the drive mechanism for the wheels 34, 36.

As shown in FIG. 5, a plurality of identical load handling devices 30 are provided, so that each load handling device 30 can operate simultaneously to increase the throughput of the system. The system illustrated in FIG. 5 may include specific locations, known as ports, at which bins 10 can be transferred into or out of the system. An additional conveyor system (not shown) is associated with each port, so that bins 10 transported to a port by a load handling device 30 can be transferred to another location by the conveyor system, for example to a picking station (not shown). Similarly, bins 10 can be moved by the conveyor system to a port from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10b ("target bin") that is not located on the top of a stack 12, then the overlying bins 10a ("non-target bins") must first be moved to allow access to the target bin 10b. This is achieved in an operation referred to hereafter as "digging".

Referring to FIG. 5, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10*a* is logged, so that the non-target bins 10*a* can be tracked.

The system described with reference to FIGS. 2 to 5 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10*b* is not at the top of a stack 12.

Figure 6A:
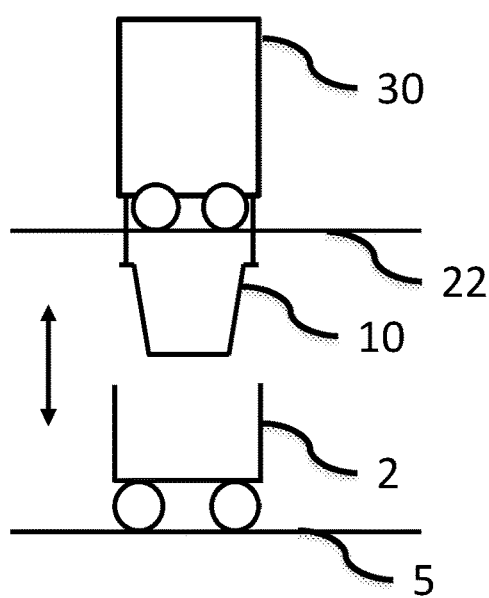
FIGS. 6a-6c are schematic diagrams showing a first and second example of loading a container onto a carriage according to a first embodiment of the present invention.
Figure 6B:
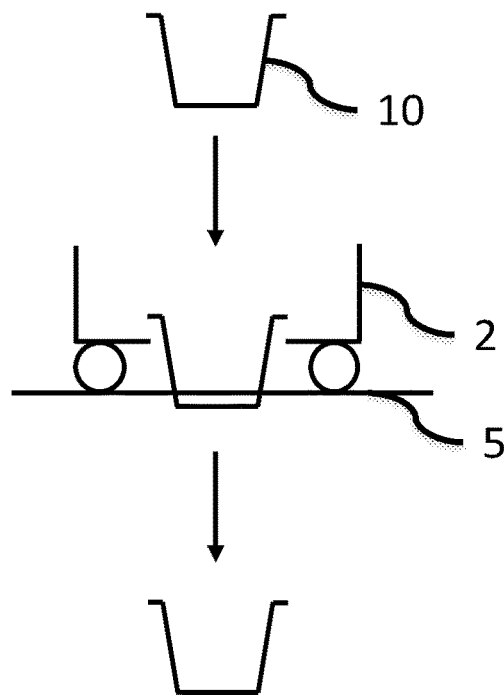
Figure 6C:
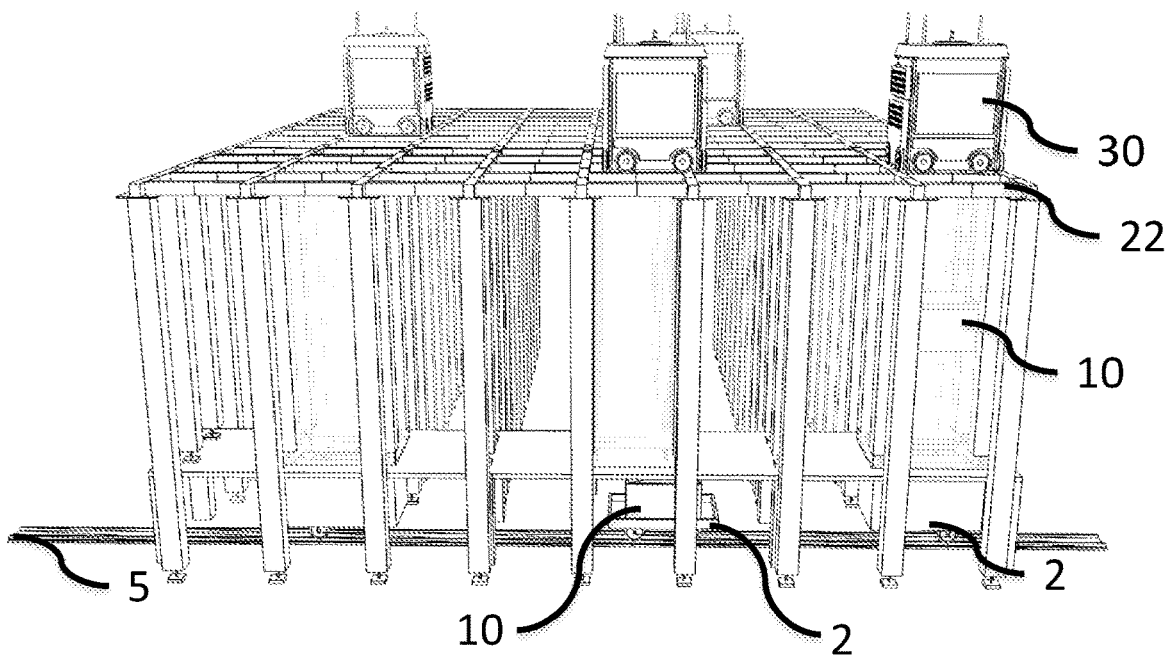

FIGS. 6*a* and 6*c* show a first example of using the system described in FIGS. 2 to 5 to load a carriage 2. In particular, a system according to a first embodiment of the present invention envisages a track 5 supporting a carriage 2 which is located underneath the framework structure 14. In this way, the carriage 2 (for example, a Magway carriage) may come to rest at a location accessible by a load handling device 30. In this way, the container 10, which is arranged to be retrieved or deposited by the load handling device 30, may be located in/on the carriage 2 by the load handling device 30. Effectively, the load handling device 30 treats the location of the carriage 2 as any other location on the framework structure 14 for the deposition or retrieval of a container 10 therefrom.

In this way, fast retrieval of containers 10 is achieved with First In, First Out container 10 flow which improves efficiency and makes it easier to maintain appropriate date order of containers 10. Completed containers 10 may be loaded into carriages 2 for easy transit.

It is envisaged that at least two locations may be provided underneath the framework structure 14 with at least one location dedicated to the deposition of a container 10 and at least another location dedicated to the collection of a container 10.

Additionally or alternatively, at least two tracks 5 may be routed underneath the framework structure 14 so as to permit the flow of carriages into and out of the framework structure 14. The incoming flow may be split and the outgoing flow may be compounded so as to achieve practical carriage handling.

It is envisaged that the container 10 and the carriage 2 may be combined into one unit, which arranged to be manipulated by the load handling device 30. In this way, the one unit is arranged to operate on a track e.g. a Magway track and yet have a location for the picking of items. In this way, the load handling device 30 may store the carriage 2 in the stacks and/or move the unit to a picking station for the collection of items. Additionally or alternatively, the tracks for the unit may be arranged to traverse from picking station to picking station so as to collect items from each picking station without the requirement for an interaction with the load handing device 30.

FIG. 6*b* shows a second example of using the system described in FIGS. 2 to 5 to load a carriage 2. In particular, the carriage 2 shown in FIG. 6*b* is arranged with a mechanism to permit the simultaneous loading of a container 10 into the top of the container 10 whilst a container 10 is unloaded from the carriage 2 through the bottom of the carriage 2. In particular, the container 10 may be loaded into the top of the carriage 2 by way of a load handling device 30. Alternatively, the carriage 2 may be loaded through the base thereof and the unloaded by a load handling device 30 from the top of the carriage 2.

In other words, a carriage may be provided with two apertures through which a container may pass to enter or exit the carriage's cavity. This may advantageously reduce an overall time required for loading and unloading a carriage. For example in which a first container is lowered towards and into a cavity in a carriage through a top aperture in the cavity while a second container is lowered out of and away from a carriage through a bottom aperture in the cavity. In other embodiments, containers may enter and leave the cavity in opposite directions (i.e. by being raised rather than lowered), or one or both of the apertures may be in different locations from the illustrated apertures, e.g. in the side walls of the carriage. This loading and unloading of the containers from the carriage may be performed by one or more load handling devices 30.

With regard to the first and second examples of the first embodiment, although they have been described with regard to the loading of a carriage 2 using a load handling device 30, it is envisaged that an external means, such as a carriage loader may be utilised. In this example, the carriage loader is envisaged to receive from the load handling device 30 the container 10 to be loaded into the carriage 2. Once the container 10 has been received by the carriage loader then the load handling device 30 may move onto other task whilst the carriage 2 is loaded by the carriage loader. The carriage loader may be arranged to move the container 10 from a reception location into the carriage 2 using a suitable mechanism. In this regard, the carriage loader is provided to receive a container 10 from the load handling device 30 and arranged to load the container 10 into the carriage 2. It is envisaged that a carriage unloader may also be provided to unload a container 10 from a carriage 2 and arranged to store the container 10 until a load handling device 30 is available to collect the stored container 10. For example, the carriage loader/unloader is envisaged to be a robot arm arranged to transfer a container 10 into the carriage 2.

Figure 7:
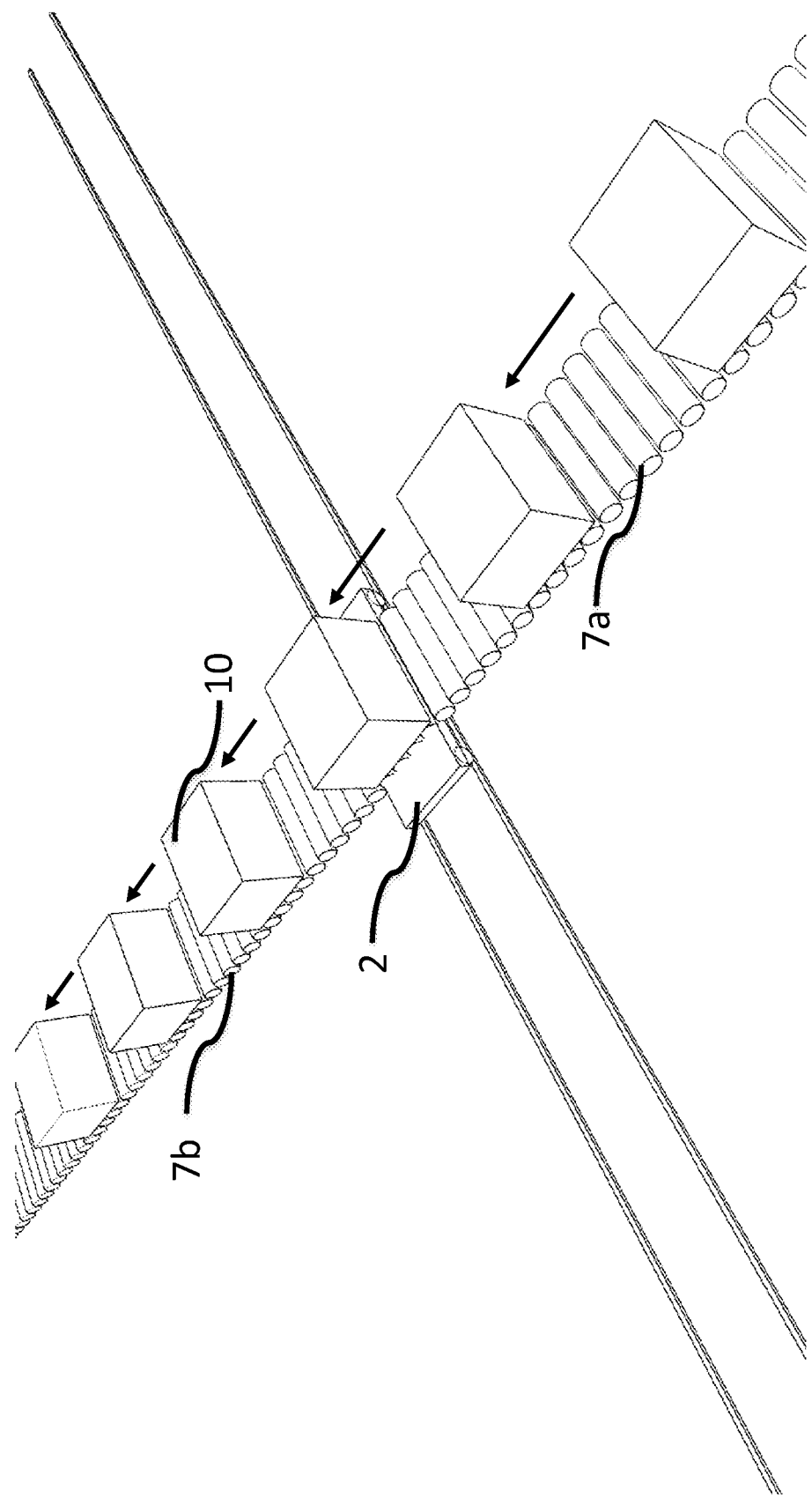
FIG. 7 is a schematic diagram showing a third example of loading a container onto a carriage according to the first embodiment of the present invention.

FIG. 7 shows a third example of the first embodiment which does not rely on the system described in FIGS. 2 to 5. In particular, the system shown in FIG. 7 involves a carriage 2 which comes to a halt at a gap in a conveyor 7. The carriage 2 is arranged to move perpendicular to the conveyor 7 by means of a track. The carriage 2 comprises a section of conveyor 7 so that a container 10 can be conveyed by a first conveyor 7*a* to a first side of the carriage 2 and then using the conveyor comprised in the carriage 2 to a second side of the carriage and then onto a second conveyor 7*b*.

Therefore, a carriage 2 may come to a stop in the gap between the first conveyor 7*a* and the second conveyor 7*b*. In this way, containers 10 may be simultaneously loaded at a first side of the carriage 2 and unloaded at a second side of the carriage 2. After the loading/unloading operation the carriage 2 can move along the track in an unloaded state or carrying a container 10.

In other words, there is depicted an example in which a conveyor for conveying containers is positioned transversely to the carriage track of magnetic support structure in the form of a Magway track. A carriage which is configured to travel along the Magway track stops in a gap in the conveyor. The carriage is provided with roller conveyors or other conveying means which align with the conveyor when the carriage stops and can be used to convey a container or other item moving along the conveyor across the carriage, transversely to the direction of travel of the carriage along the carriage track, or to convey an item which is on the conveyor onto the carriage, or to convey an item which is on the carriage onto the conveyor. This may advantageously enable the carriage to be unloaded of one container and loaded with another container substantially simultaneously.

A container which is travelling along the conveyor reaches the carriage, and can then either be taken away from the conveyor by the carriage, along the track, or be conveyed across the carriage by the conveying means on the carriage, depending on the intended destination of the container. If the container is conveyed away along the track by the carriage, a second carriage may arrive to fill the gap in the conveyor left by the first carriage, either to enable a subsequent container to cross the gap in the conveyor or to enable the subsequent container to be removed from the conveyor like the first container was. The second carriage may bring with it a further container which is to be conveyed off the carriage and onto the conveyor.

In the illustrated example the Magway track and the conveyor are substantially orthogonal to one another, but in other embodiments they may be at different angles. Furthermore, multiple conveyors and/or multiple Magway tracks may meet at a turntable-type device which may enable containers to transition between different conveyors and/or different carriages.

Although many of the illustrated examples include Magway magnetic support and/or conveying structures, other forms of magnetic support and/or conveying structures may be used instead or in addition.

Figure 8:
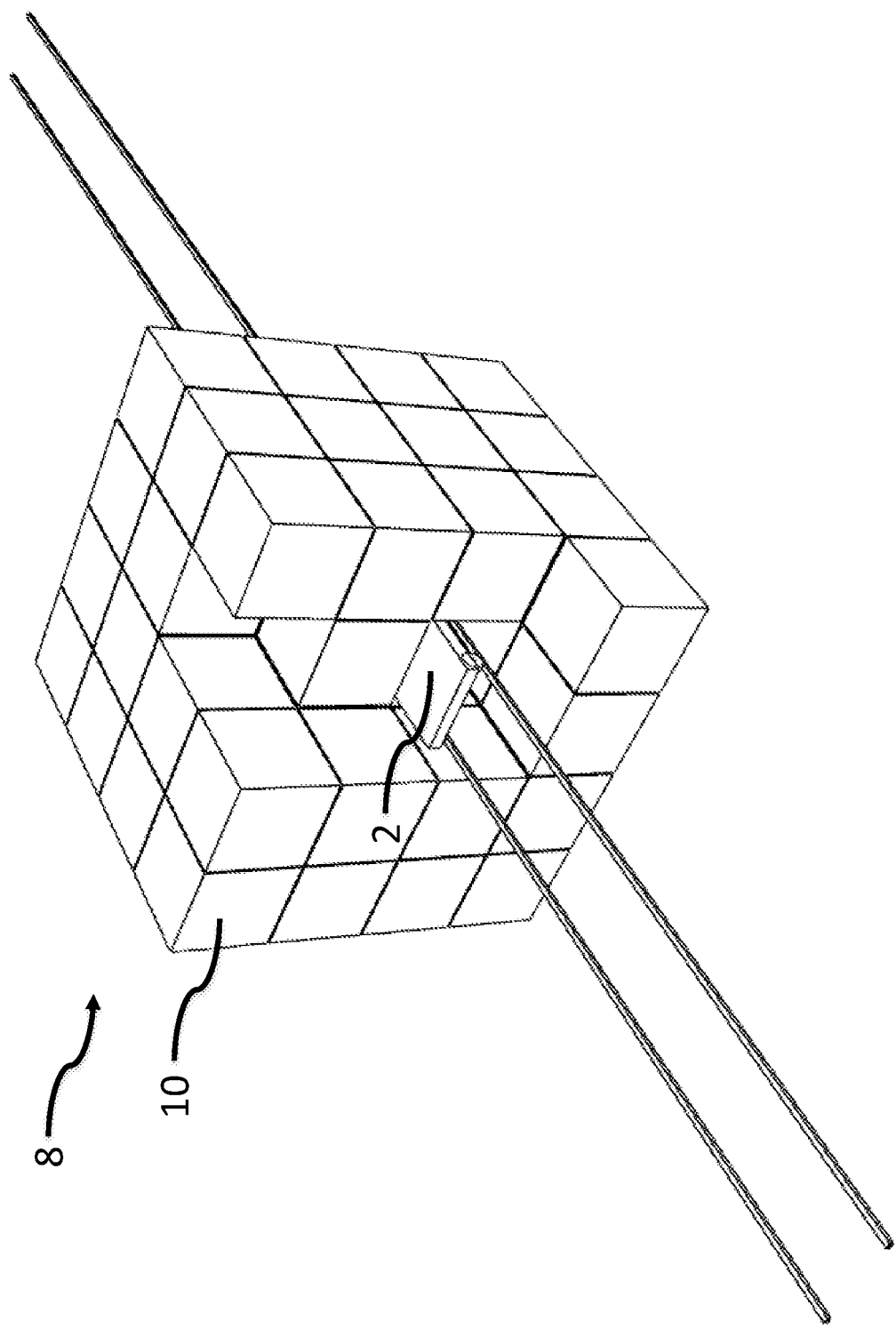
FIG. 8 is a schematic diagram showing a fourth example of loading a container onto a carriage according to the first embodiment of the present invention.

FIG. 8 shows a fourth example of the first embodiment of the present invention. This example relies on a cluster 8 of containers 10. The containers 10 are arranged to interact with one another so as to rearrange their topography a required. Further detail of the cluster 8 is addressed in Ocado Innovation Limited UK Patent Application No. GB1816148.9 filed on 3 Oct. 2018 (Ocado Innovation Limited Reference Number 000113GB1).

In particular, in this example, the track for the carriage 2 is arranged to traverse the cluster 8. As described in GB1816148.9, the containers 10 of the cluster 8 are arranged to move freely throughout the cluster 8 by interaction amongst each other. Therefore, the carriage 2 may move along a track to a location within the cluster 8. A container 10 of the cluster 8 may then move freely onto the carriage 2. The carriage 2 may then move out of the cluster 8, along the track, carrying the container 10. Similarly, a carriage 2 may enter the cluster 8 carrying a container 10 to be unloaded. In this situation, the carriage 2 may stop in the cluster 8 at which point the container 10 stored thereon may interact with other containers 10 in the cluster 8 and move itself off of the carriage 2 into the cluster 8.

In this example, a top surface of the carriage 2 may be arranged to behave in the same manner as the top of a container 10 arranged to operate in the cluster 8. In this way, similar or equivalent mechanical features and properties are imbued to the top surface of the carriage 2 so as to correctly operate in the manoeuvring of containers 10 onto or off of the carriage 2.

In one example, each container 10 may comprise a magnetic clamping system arranged to secure one container 10 to another container 10. Therefore, the same or equivalent magnetic clamping system may be implemented on the top surface of the carriage 2 so that the container 10 may interact and clamp to the carriage 2 in the same manner as the container 10 would clamp to another container 10.

In other words, there is depicted an example of a track passing through a storage grid comprising a plurality of relatively moveable storage boxes. In such an embodiment, a carriage which is configured to pass along the track may include complementary components to the components on the relatively moveable storage boxes to enable the relatively moveable storage boxes to move onto and/or off the carriage as the relatively moveable storage boxes move into and out of contact with each other. This may enable items to be brought into and out of such a storage cluster, and taken to a different location, by moving a specific storage box onto the carriage so that the carriage can carry the box away. For example, a top surface of the carriage may be configured in substantially the same way as the top surfaces of the storage boxes described and illustrated in PCT/EP2018/076928 which is incorporated herein by reference, and the carriage may include similar or equivalent mechanical features and properties to the storage boxes. For example, the storage boxes may have a magnetic clamping system to secure an upper box rigidly to the box directly beneath. This mechanism may also be implemented in the upper surface of the carriage so that a storage box from the storage grid can clamp to the carriage in the same way that it would to another storage box.

Therefore, the example described above relating to the first embodiment of the present invention generally relate to the concept of utilising a stationary carriage 2 to load/unload containers 10 therefrom. In this way, items in the container 10 are handled carefully to prevent damage thereto.

Second Embodiment

The examples provided in the first embodiment of the present invention generally have the disadvantage that the carriage 2 must stop to permit the loading/unloading of a container 10. However, using stationary carriages 2 may limit the throughput of containers 10 through a facility or necessitates the further provision of interface points on the container 10/carriage 2 which adds to a space requirement, complexity and maintenance.

The second embodiment of the present invention addresses the drawbacks of the first embodiment by implementing a system which permits the carriage 2 (such as a Magway carriage) to continue to move whilst a container 10 is loaded/unloaded. In this way, quicker loading of carriages 2 is achieved whilst ensuring that the manner of loading the container 10 into the carriage 2 prevents damage to potentially delicate items within the container 10. For example, a container 10 comprising eggs must not be roughly loaded in the carriage 2 as this may cause the eggs to break. Therefore, the example provided in the second embodiment permit the delicate loading of the carriage 2 whilst offering increased speed of loading/unloading as compared to other techniques.

Figure 9A:
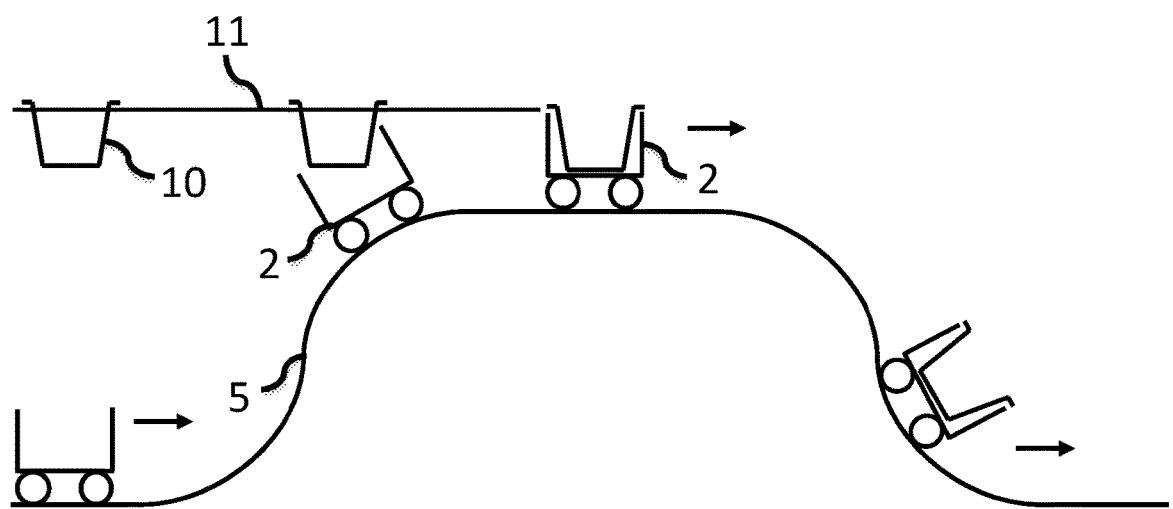
FIGS. 9a-c are schematic diagrams showing a first example of loading/unloading a container onto/from a carriage according to the second embodiment of the present invention.

FIG. 9a shows a first example according to the second embodiment of the present invention. In this example, a track 5 is provided for transportation of each carriage 2. This example shows the loading of each carriage 2 with a container 10. To facilitate this each container 10 is transported on a conveyor 11 (such as a conveyor belt). At the end of the conveyor 11 the container 10 is collected by the carriage 2, after which the carriage 2 can continue along its track 5. In the example of a Magway carriage, the track 5 may comprise means for moving the carriage, for example, linear motors. In this way, the carriage may be passive without a requirement to be powered.

In this example, the conveyor 11 may match speeds with a carriage 2 on the track 5. This may be achieved by varying the speed of the conveyor 11, the speed of the carriage 2 on the track 5 (such as by using an incline to slow down the carriage 2).

In this regard, the track 5 may include sections having different gradients from one another which may be used to convert kinetic energy of a carriage 2 to gravitational potential energy of a carriage 2, and vice versa. Such a configuration of track (with one or more substantially horizontal sections and one or more sloped sections) can be used to control the speed of motion of a carriage 2 along the track 5, which may facilitate or make easier other interactions with the carriage 2. As an example of this, a configuration of track is shown which includes three horizontal sections which are separated from each other by two intervening sloped sections. The five sections together resemble a "hill" or "hummock" in the track 5. A carriage 2 which travels along the track 5 from the left to the right as illustrated in the figure will slow down as it climbs the first sloped section and gain a corresponding amount of gravitational potential energy (subject to any losses due to friction, air resistance, etc.).

Collection of the container 10 is achieved by ending the conveyor 11 in synchronisation with the arrival with a moving carriage 2. In this way, as the container 10 leaves the conveyor 11 it is captured by the carriage 2. Advantageously, an incline in the track 5 may ensure alignment between the container 10 and the carriage 2 by having the carriage 2 meet up with the container 10 in a manner that restrains at least one surface of the container 10. For example, as shown in FIG. 9a, as the carriage 2 comes up to meet the container 10 a front edge of a carriage proceeds slightly ahead of container 10. In this way locating the container 10 within the carriage 2 is more easily achieved. In particular, after the front edge of the container 10 is located within the carriage 2 then locating of a rear edge of the container 10 within the carriage 2 is more easily achieved.

As shown in FIG. 9a, after collection of the container 10, the track 5 may comprise a downward slope to aid in the acceleration of the carriage 2 containing the container 10.

In other words, a carriage-loading operation is facilitated by the slowing of the carriage 2 as it climbs the first sloping section to reach the middle horizontal section (at the top of the hill in the track). A conveyor 11 which is mounted above the first sloping section of track 5 conveys containers 10 towards the top of the hill. The speed of the conveyor 11 may be controlled such that a container 10 travelling along the conveyor 11 approximately matches the speed of a corresponding carriage 2 as the carriage 2 reaches the summit of the hill (i.e. along at least the final section of the first sloping section and/or the "top" of the hill). Furthermore, the conveyor 11 may be controlled such that a container 10 will be at approximately the position of a cavity of the carriage 2 when the carriage 2 reaches the top of the hill. This may allow the container 10 to be delivered into the carriage 2 as the conveyor 11 releases the container 10. The carriage 2 and the container 10 may then proceed along the substantially horizontal top of the hill, and down the second sloping section, regaining at least some of the kinetic energy that was converted into gravitational potential energy as the carriage climbed the first slope.

The conveyor 11 may, if necessary, indirectly control the speed of the carriage 2 as the carriage 2 reaches, moves along and/or leaves the top of the hill, e.g. to accelerate the carriage if it has slowed down too much on its ascent up the first sloping section or to decelerate the carriage 2 if the carriage 2 is moving faster than the containers 10 on the conveyor 11. The conveyor 11 may also help ensure the carriage 2 is not slowed down as the carriage receives the extra weight of the container 10 and any contents. The conveyor 10 may achieve this by indirectly applying a force to the carriage, via the container 10. Alternatively or additionally, the conveyor 11 may control the speed at least one of the containers 10 on the conveyor 11 to bring the speed of the at least one container 10 into line with that of the carriage approaching or on the top of the hill. Optionally, sensors may be used to detect a position of the container 10 and/or the carriage 2 and arranged to control the speed of the carriage 2 and/or container 10 to cause the matching of speeds. To achieve this, the sensors may measure a distance and/or use feedback from linear motors used to power Magway carriage 2 on a track 5.

The carriage 2 and the container 10 can then continue along the track 5, gaining speed along the second sloping section, and continuing along the right-hand substantially horizontal section.

It is envisaged that a number of different mechanisms may be employed to attach the container 10 to the conveyor 11 until its required release into the carriage 2. For example, mechanical, electrical, magnetic or a combination thereof may be used. In one example, mechanical latches may be used to secure each container 10 to the conveyor 11 until the moment of release at which the mechanical latches are disengaged to permit the container 10 to be collected by the carriage 2.

In some embodiments, the conveyor 11 may alternatively be a passive conveyor, for example including non-powered rollers. In those embodiments, the carriage 2 would approach the container 10 from underneath, as illustrated and previously described, and would make initial contact with the container 10 very slowly, gradually accelerating thereafter. The container 10, being on the passive conveyor 11, would accelerate at the same rate as the carriage 2 (being pushed along the non-powered rollers of the conveyor 11 by the carriage 2) until fully captured by the carriage 2, i.e. until fully engaged in the cavity of the carriage 2. The conveyor 11 may be sloped slightly downward to aid the speed-matching process (i.e. allowing the carriage 2 to make initial contact at a greater speed). The use of the passive conveyor 11 may advantageously avoid the need for precise speed or position control, since the container 10 is free to move with the carriage 2. The passive conveyor 11 may be located at an end of an active conveyor 11, which may have brought the container 10 to the passive conveyor 11.

Figure 9B:
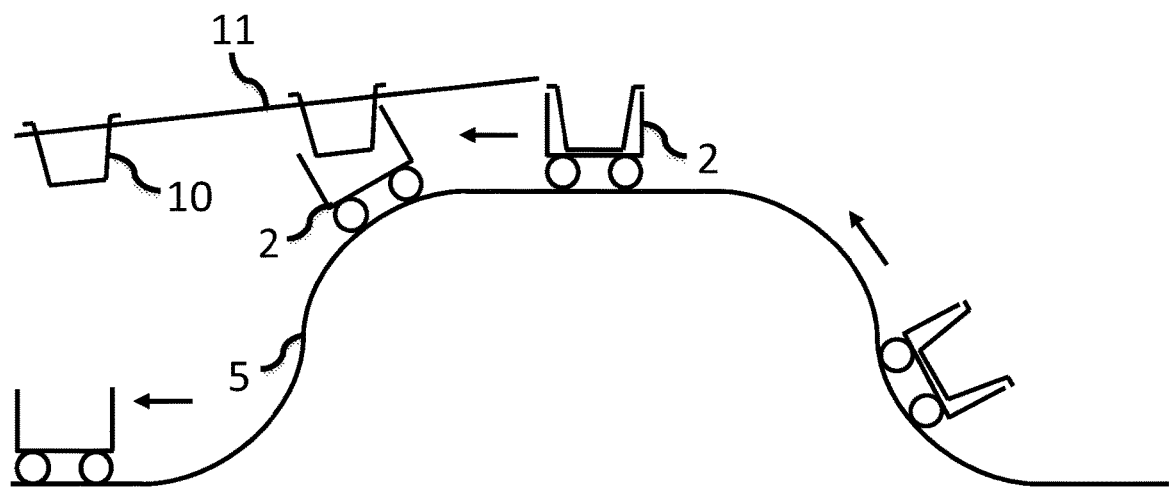

FIG. 9b shows an example of a substantially similar configuration of track 5 and conveyor 11 which may be used to remove containers 10 from carriages, e.g. with the containers 10 and carriages 2 travelling from right to left rather than left to right. As shown in this Figures, the conveyor 11 has a slight downward slope to aid in the removal of containers 10 from carriages 2. In particular, the downward slope uses gravity to move the containers 10 away from the carriage 2.

Optionally, the conveyor may be mounted above the downward slope rather than above the upward slope. A pair of "hills" and conveyors may therefore be used as the "ingress" and "egress" points for containers 10 into and out of carriages. The carriages may travel along whatever track is between the two "hills", conveying the containers 10 and their contents from the first hill to the second in what may be arranged to be a relatively fast and efficient way. The track between the two hills may for example be arranged to be in an at least partly evacuated space, to minimise losses due to air resistance. The track may for example be in an enclosed space, such as a tube or tunnel. One or more pumps may act to extract air from the tube. The one or more pumps may preferably act on a relatively central length of the tube, which may advantageously result in an air pressure gradient which acts to assist the movement of a carriage along the tube.

To assist containers 10 in leaving a conveyor and entering a carriage or in leaving a carriage and joining a conveyor, the conveyor may be sloped such that the conveyor points in an optimal direction for transferring a container 10 into or out of the cavity of a carriage.

In the case of unloading a container 10 from a carriage onto a passive (i.e. unpowered) conveyor, both the carriage track and the conveyor could also be sloping downward (the carriage track may be sloped slightly more steeply downwards the conveyor), such that as the container 10 becomes detached from the carriage, it continues to roll away from the point of detachment, until it reaches a powered conveyor section adjacent to the unpowered conveyor section.

In some embodiments, dedicated carriage-accelerating and/or carriage-decelerating means may be provided. The dedicated carriage-accelerating/-decelerating means may assist a carriage in reaching the top of a sloping section of track (e.g. if the carriage in question contains a heavy container 10), in slowing down to the speed of a container 10 on a conveyor, or in accelerating away after collecting the container 10, for example.

Although the illustrated example includes two sloping sections, allowing a carriage to climb a first sloping section and descend a second sloping section, such that the carriage can continue in substantially the same direction that it arrived in, other embodiments may include only a single sloping section. In such configurations, a carriage may ascend the single sloping section, slowing as it loses kinetic energy and gains gravitational potential energy. A conveyor may convey a container 10 to the point on the single sloping section at which the carriage will come to a stop (i.e. the point at which the carriage runs out of kinetic energy and maximises its gravitational potential energy), at the moment that the carriage will reach that point on the single sloping section. This may, as previously described, allow the container 10 to be deposited in a cavity of the carriage. The carriage and the container 10 can then proceed together down the single sloping section and away, e.g. to another such single sloping section or to a "hill"-like track as illustrated, or elsewhere, at which the container 10 can be removed from the carriage. Other variations on the form of the track are also possible. In some cases, it may be desirable for two or more tracks to be orientated transversely to one another, each of the tracks passing over the same hill. One or more conveyors may bring containers 10 to the top of the hill and deposit the containers 10 in carriages that travel along the two or more transverse tracks. The arrivals of the carriages in the vicinity of the top of the hill may be timed such that a carriage arrives in time to receive a container 10 from a given conveyor, and to avoid collisions of the carriages as they traverse the crossing point of the tracks. In some embodiments, the same conveyor may be used to deposit containers 10 in carriages on different tracks. For example, a first container 10 on the conveyor may be deposited in a carriage running on a first track. A second container 10 on the same conveyor may be deposited in a carriage running on a second track which runs transverse to the first track. Alternatively or additionally, multiple tracks may run substantially parallel to one another over the same hill. In such cases, a corresponding number of conveyors may be provided in the same vicinity, to load containers 10 into the carriages.

Figure 9C:
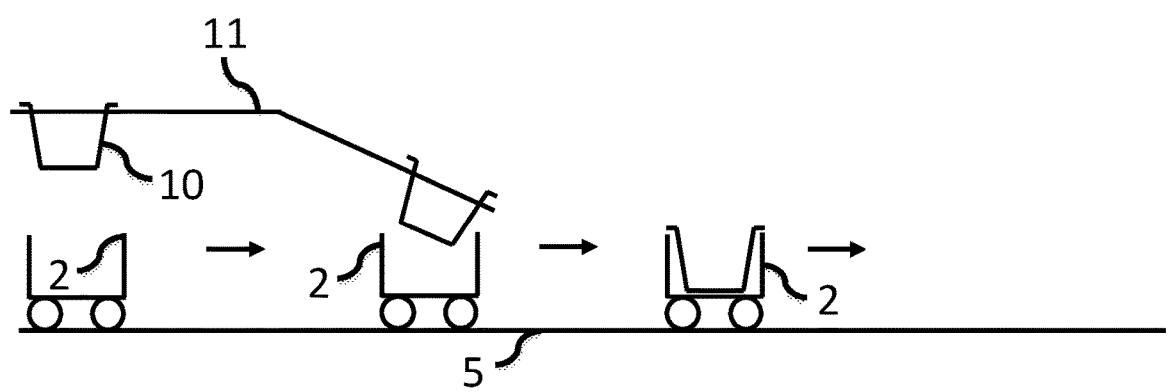

FIG. 9c shows a modification to the system shown in FIG. 9a. Instead of using an elevated portion, it is envisaged that the carriage 2 enters the illustrated section at a location positioned close to the conveyor 11 (as compared to FIG. 9a). In this way, the use of a hump shown in FIG. 9a is avoided. Therefore, control of the speed matching may be achieved by varying the speed of the carriage 2 on the track 5 and/or varying the speed of the container 10 on the conveyor 11. The conveyor 11 may further comprise a downward sloping portion at the end thereof to transfer the container 10 from the conveyor 11 into the carriage 2 under the force of gravity or other mechanism.

Figure 10:
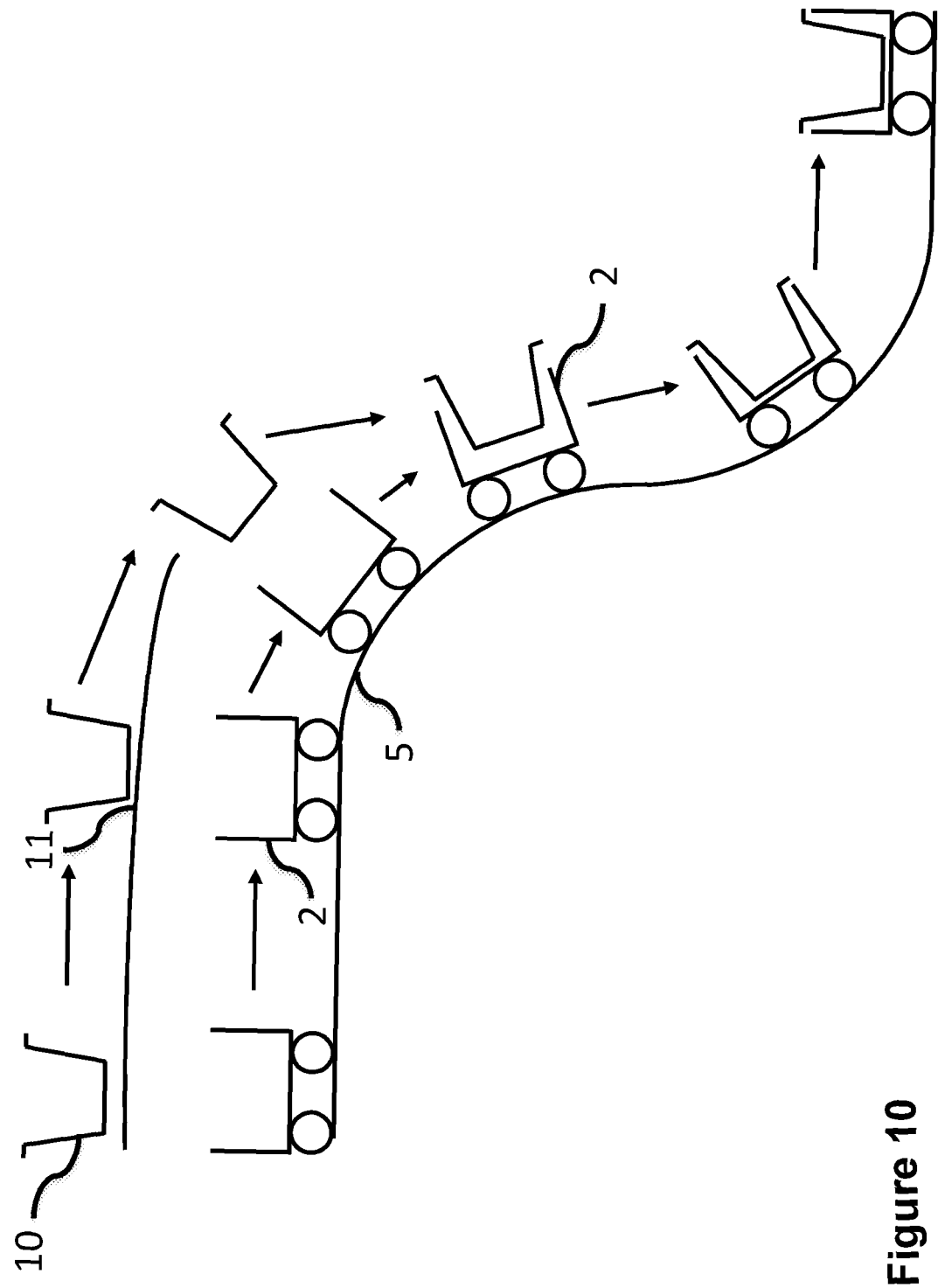
FIG. 10 is a schematic diagram showing a second example of loading a container onto a carriage according to the second embodiment of the present invention.

FIG. 10 shows a second example according to the second embodiment of the present invention. In the second example, the container 10 essentially falls off the end of the conveyor 11. The speed and angle are carefully engineered so that the trajectory of the falling container 10 is gently intercepted by the carriage 2.

In particular, the conveyor 11 may be implemented with optional means arranged to secure the container 10 to the conveyor 11. In the example shown in FIG. 10, the container 10 may simply ride on top of the conveyor using friction to keep the container 10 in contact with the conveyor 11. In this example, the container 10 may simply fall off the end of the conveyor 11.

Advantageously, the track 5 used for the carriage 2 need not be arranged to meet up with the conveyor 11 as shown in FIG. 9a. Instead, the track 5 and the conveyor 11 may run parallel with one another. The conveyor 11 and carriage 2 may be synchronised so that as the container 10 leaves the conveyor 11 the carriage 2 is suitably positioned to catch the free-falling container 10.

Optionally, the track 5 may be arranged with a downward slope so that the catching of the container 10 is performed as gently as possible i.e. with the carriage 5 accelerating to closer to the same speed as the free-falling container 10.

In other words, a carriage track 5 is provided with a first, substantially horizontal section (towards the left-hand side of the figure); a second, sloping section of the track (to the right of the first section); and a third, substantially horizontal section (to the right of the second section). Empty carriages travel from the left to the right along the carriage track, which in the illustrated example is a magnetic Magway track. A conveyor is positioned above the first section of the carriage track, ending near the transition from the first section to the second section. The right-hand end of the conveyor slopes slightly downwards, approximately corresponding to the slope at the transition between the first and second sections of carriage track. Containers 10 are conveyed along the conveyor and fall off the right-hand end of the conveyor. The containers fall, under gravity, into carriages which are travelling along the carriage track. The conveyor and/or the carriages on the carriage track beneath the conveyor may be controlled such that containers which fall off the right-hand end of the conveyor leave the conveyor with sufficient horizontal momentum to land in a specific carriage as the carriage moves down the second section of the carriage track. The carriages and their respective containers then travel along the rest of the second section to the third section and beyond. The angle of the conveyor and/or the angle of the track may be chosen to achieve particular trajectories of containers leaving the conveyors and landing in carriages.

Figure 11:
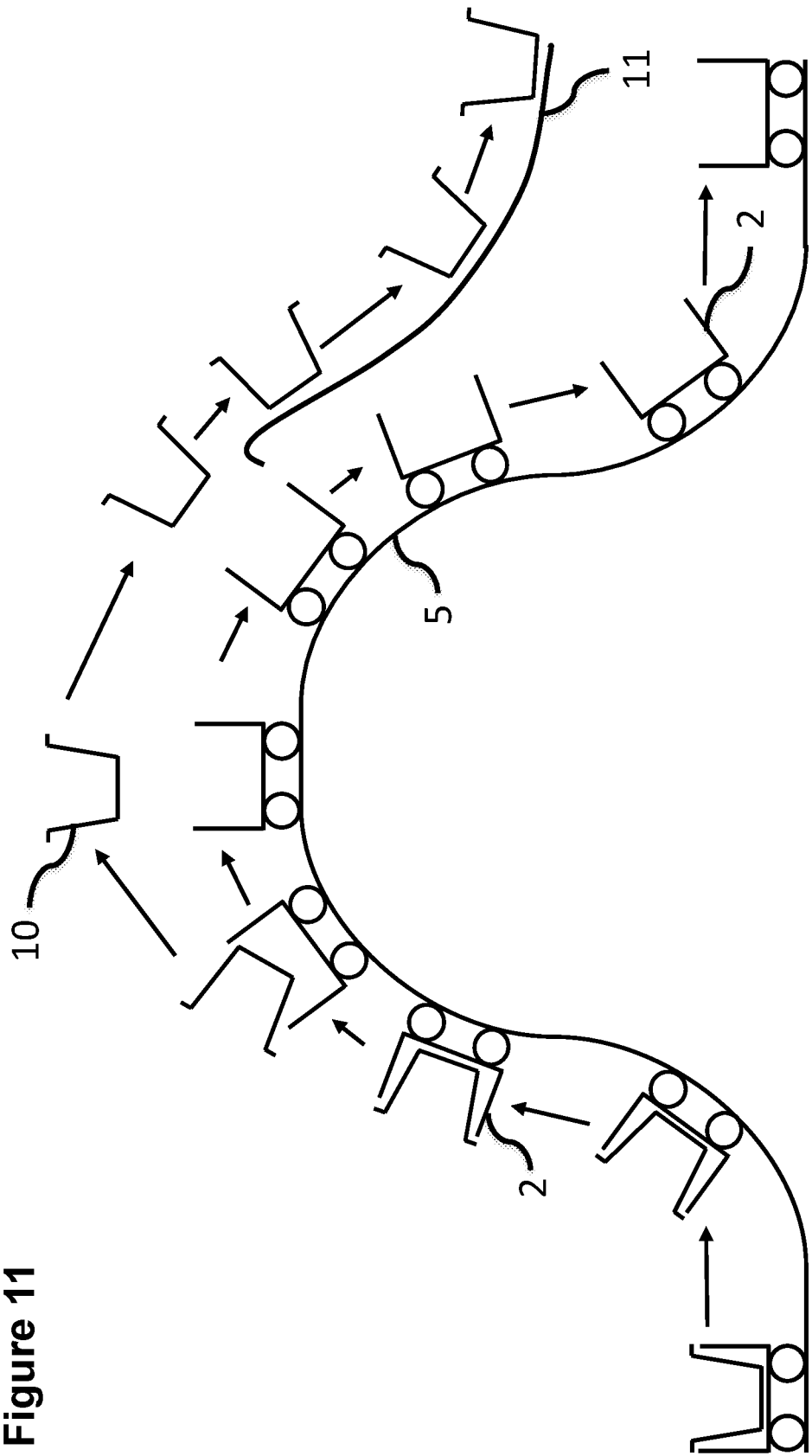
FIG. 11 is a schematic diagram showing a third example of loading a container onto a carriage according to the second embodiment of the present invention.

FIG. 11 shows a third example of a second embodiment of the present invention. Unlike the previous two examples, the third example relates to the release of a container 10 from a carriage 2 and its capture by a conveyor 11.

In this example, the carriage 2 containing the container 10 is accelerated up an incline in the track 5. A sudden change in direction at the top of the incline in the track 5 (in this instance the track 5 flattens and then descends) causes the container 10, which is not restrained inside the carriage 2 to continue its motion and to leave the carriage 2. In one example, the carriage 2 is accelerated downwards at a rate that is greater than that experience due to gravity alone so that the container 10 leaves the carriage 2. In this way, the carriage is driven down the descending track 5 which causes the container 10 to free-fall upwards.

The carriage 2 may then continue along the track 5 whilst the container 10 continues upwards. Under gravity, the container 10 will reach a peak and then descend. In this example, a conveyor 11 is arranged to catch the free-falling container 10 and move it to a required location. In this example, the container 10 may be releasably attached to the carriage 2 by way of attaching means (such as mechanical latches) which are released just before the change in incline of the track 5 thereby allowing the release of the container 10 from the carriage 2.

In other words, a carriage track with a first, substantially-horizontal section; second and third sloping sections forming a "hill" or "hump-backed bridge" shape; and a fourth, substantially-horizontal section on the opposite side of the hill formed by the second and third sections from the first section. A carriage with a container approaches the hill along the first section. In the illustrated example, the carriage is driven up the second section, e.g. such that the speed of the carriage is not significantly reduced as the carriage gains height. In other embodiments, the carriage may not be driven but may arrive at the end of the first section/beginning of the second section with sufficient momentum to travel over the hill at speed without being driven.

As the carriage nears the top of the hill, the carriage's trajectory is constrained by the carriage track such that the carriage follows the curvature of the hill. The carriage may additionally be accelerated as it climbs the hill and/or traverses the peak of the hill. However, the container is not constrained, and the container's momentum causes it to carry on its upward trajectory such that it leaves the carriage. Once the container has left the carriage, the container follows a free-fall arc as its upward kinetic energy is converted into gravitational potential energy and then, once its upward kinetic energy is zero, it begins to fall again.

A conveyor 11 is located above the third, sloping section of the carriage track in such a position that the container, following its free-fall arc trajectory, lands on the conveyor and is conveyed away from the vicinity of the hill by the conveyor. The conveyor may be sloped such that its angle corresponds to the expected angle of a container following the arc-shaped trajectory after leaving the carriage. This may help to minimise damage to any of the items in the container. The conveyor may then level out, and conveys the container away to another location.

The carriage completes its journey over the hill, down the third, sloping section, and along the fourth section.

Figure 12:
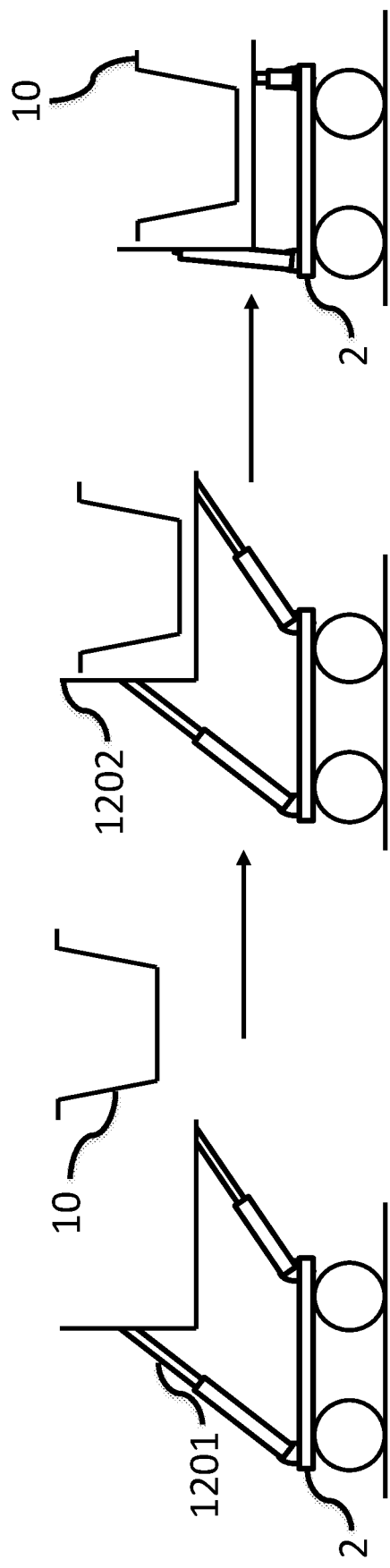
FIGS. 12a-12c are schematic diagrams showing further detail about the second and third examples of the second embodiment of the present invention.

FIGS. 12a-12c show an example of a carriage 2 arranged to receive a container 10 in a manner that minimises the risk of damage to the container 10 and its contents. To achieve this, the carriage 2 shown in FIG. 12a comprises a piston 1201 (such as an hydraulic or pneumatic piston) arranged to move a carrier 1202. In an extended position the piston 1201 may locate the carrier 1202 in a forward and upward position arranged to receive the container 10. It is envisaged that the piston 1201 may be implemented in a number of different ways, such as using linear actuators or the like.

In FIG. 12b the carrier 1202 has received the container 10 at which point the piston 1201 is arranged to absorb the energy resulting from the difference in speeds between the carriage 2 and the container 10. In this way, the risk of damage to the container 10 and its contents is reduced.

As the carriage 2 travels onwards, the carrier 1202 may be retracted into the carriage 2, as shown in FIG. 12c. By retracting the carrier 1202 into the carriage 2, the profile of the carriage 2 is thereby reduced leading to aerodynamic friction reductions and ability to fit into smaller spaces. For example, a Magway carriage 2 may operate within a pipe. By retracting the carrier 1202 then the Magway carriage comprising the container 10 may fit within a smaller pipe. Similarly, a carriage 2 may generally operate outside of a pipe but need to transition into a pipe along its journey. Therefore, the carrier 1202 may interfere with the pipe on entry, therefore, by retracting the carrier 1202 before entering the pipe the interference may be avoided.

FIGS. 12a-12c show only an example of an implementation of a carriage 2. It is envisaged that other solutions may be implemented. For example, the carrier 1202 may not be extended forward but only upwards, or the carrier 1202 may be extended rearwards (i.e. in the opposite directions to the direction of travel of the carriage 2). In another example, the carrier 1202 may move from a forward position to a rearwards position during capture of the container 10. In this way, more energy may be absorbed caused by the difference in speed between the carriage 2 and the container 10. After which the carrier 1202 may be retracted into the carriage 2 as shown in FIG. 12c.

Such a carriage 2 according to the above-described example may be used with any of the examples of container 10 collection/release as described previously. For example, with reference to FIG. 9a, collection of the container 10 by the carriage 2 may be performed using the above-described carriage 2 comprising a piston 1201 and carrier 1202. In particular, by using a carriage 2 wherein the carrier 1202 may extend forward is that as the carrier 1202 captures the container 10 then the piston 1201 will be arranged to rotate as part of speed matching the container 10 to the carriage 2. As a result, the container 10 may be lifted. This upwards motion may be used to disengage the container 10 from the conveyor 11. For example, if mechanical latches are used then the upwards motion may disengage those latches and thereby lift the container 10 off the conveyor 11 and transfer it to the carriage 2.

In other words an example of a carriage is depicted which includes a grabbing mechanism configured to receive a container which may be stationary or moving at a different rate and/or in a different direction from the carriage, e.g. along a conveyor. In the illustrated example, the grabbing mechanism is initially extended forwards and slightly upwards (as defined by the orientation and direction of movement of the carriage). When the container is received in the grabbing mechanism, the grabbing mechanism retracts into a more central and lowered position. This retraction may allow the carriage and the container to assume a configuration which meets one or more requirements in terms of height, width and/or length. The grabbing mechanism also accommodates the relative speed difference between the container and the carriage, to help minimise damage to the container, the contents of the container and/or the carriage. The grabbing mechanism may for example include one or more pneumatic pistons, springs or other components which help to absorb the speed difference. The grabber, as part of the speed difference absorption, may extend behind the carriage before being fully retracted.

The carriage illustrated may include or be provided with information from one or more sensing means configured to determine a location of a container. This information may be used by a control unit to control the position of the grabbing mechanism (including for example the extent of extension or retraction of the grabbing mechanism and/or the angle of the grabbing mechanism relative to the carriage) and/or the speed of the carriage to enable the grabbing mechanism to grab or capture the container.

In the illustrated example, the container is initially above and to the right of the carriage. However, the grabbing mechanism may be arranged to allow pivoting and/or other movements to accommodate an initial position of container which is above or below and/or to one side or the other of the carriage. The grabbing mechanism may be able to scoop up a container which is sitting on a floor or other surface next to the carriage.

If the grabber arms of the grabbing mechanism are extended forward when the grabbing mechanism contacts the container, the grabber arms may rotate slightly, causing a slight lifting of the container by virtue of the arc through which it travels on the grabbing mechanism. This may advantageously help lift the container off whatever support or suspension system it is initially supported by, and into the control of the carriage.

Figure 13:
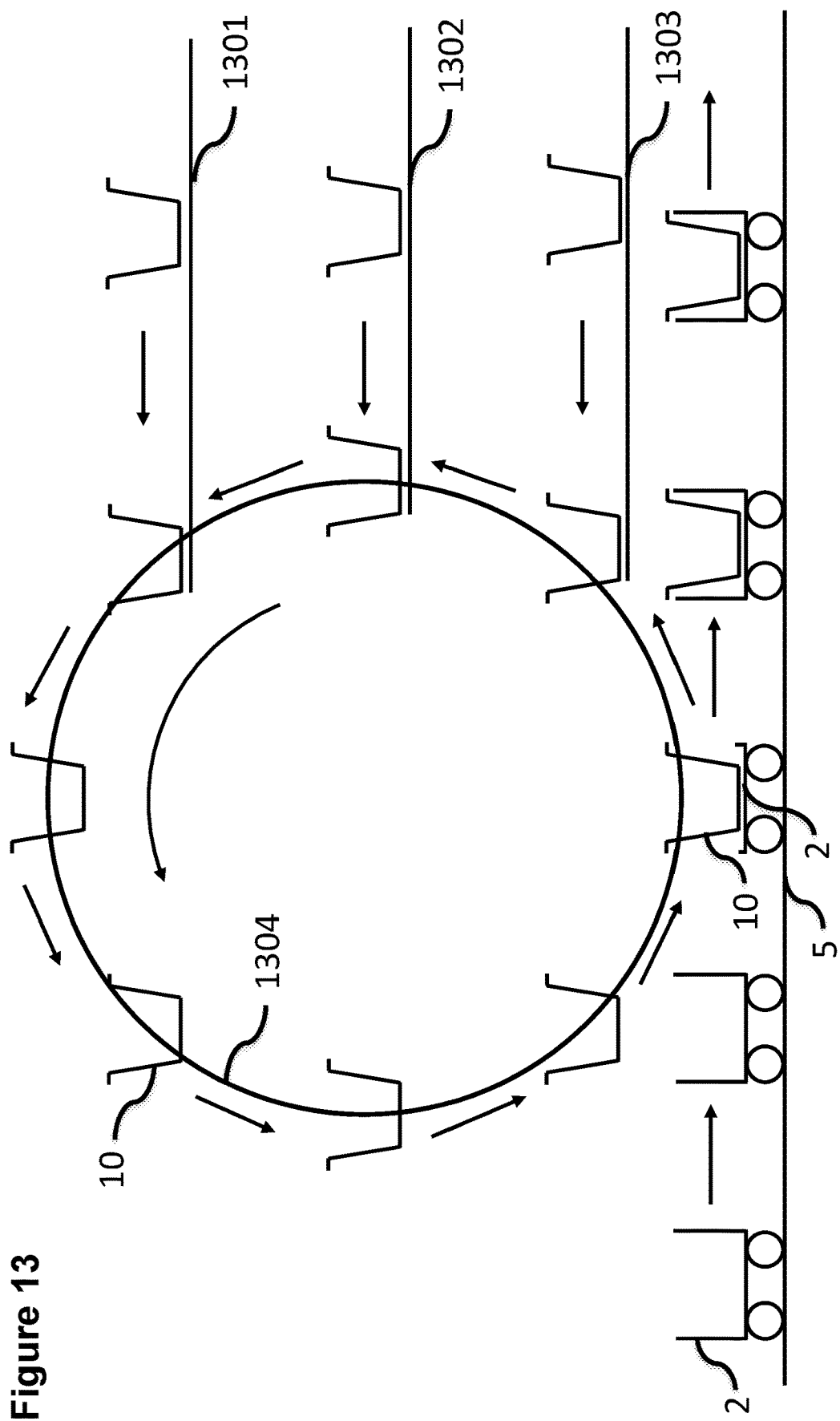
FIG. 13 is a schematic diagram showing a fourth example of loading a container onto a carriage according to the second embodiment of the present invention.

FIG. 13 shows a fourth example of the second embodiment. In this example, advantageously, a number of different functions are combined thereby providing multiple advantages. For example, the system shown in FIG. 13 provides the function of previous examples of the second embodiment, namely, the relocation of a container 10 into a carriage 2. However, unlike previous examples, the fourth example of the second embodiment also allows for the temporary storage of containers 10 (referred to as "buffering") before output to a carriage 2. Such a function is useful on output from a warehouse or the like outputting containers 10, which might be somewhat irregularly output, and therefore buffering containers 10 on output may permit their timely input into each carriage 2.

The system shown in FIG. 13 comprises at least one input conveyor 1301. In the system shown in FIG. 13 is shown with three input conveyors 1301, 1302 and 1303. It is envisaged that any number of input conveyors may be implemented as needs require. The system further comprises a rotary accumulator 1304 arranged to collect containers 10 from each of the input conveyors 1301-1303 and store them on the circumference thereof.

Moreover, the rotary accumulator 1304 is arranged to output a container 10 into a carriage 2. Each carriage 2 is arranged to travel along the track 5 tangential to the rotary motion of the rotary accumulator 1304. In this way, a carriage 2 may arrive at the circumference of the rotary accumulator 1304 empty of a container and leave the circumference of the rotary accumulator 1304 comprising a container 10, without the need for the carriage 2 to be stopped to perform the loading of the container 10.

Similarly, such a system may be used in reverse to unload a carriage 2. In this example, a carriage 2 arrives laden with a container 10 which is extracted by the rotary accumulator 1304 and stored thereon before being output to at least one conveyor.

A further advantage of the above-described example is that the speed of each of the conveyor 1301, rotary accumulator 1304 and track 5 may be tuned to provide optimal throughput of containers 10. In particular, the speed (of the circumference) of the rotary accumulator 1304 may be arranged to match the speed of the carriage 2 to ensure that each location for carriage storage on the rotary accumulator 1304 corresponds with a passing carriage 2 on the track 5. Moreover, the containers 10 may be delivered by each conveyor 1301-1303 at a fraction of the speed at which they are loaded into carriages 2. In the example shown in FIG. 13, because there are three conveyors shown, the speed of conveyors 1301-1303 may be one third of the speed at which containers 10 are loaded into carriages 2.

Advantageously, by using a relatively large-radius wheel for the rotary accumulator, the speed of rotation of the outer circumference of the rotary accumulator (where the container-supports are mounted) can be made relatively high, allowing the container-supports of the rotary accumulator to receive and manoeuvre containers 10 from the multiple illustrated conveyors (which can move at relatively slow speeds) rather than from only one conveyor. The carriages 2 are controlled to move at a corresponding speed to the outer circumference of the rotary accumulator, such that the container-supports on the wheel can be emptied in sequence into the carriages moving along the track 5 beneath the rotary accumulator 1304.

Optionally, the carriage 2 may be implemented without side walls i.e. as a tray. This is shown, by way of example only, as the central carriage 2 in FIG. 13. Without side walls the carriage 2 may be more easily loaded/unloaded. However, movement of the container 10 within the carriage 2 is less well constrained without the use of latches of the like to secure the container 10 to the carriage 2.

In an example modification, the circumference of the rotary accumulator 1304 may not be constant. Instead, locations for storage of containers 10 on a circumference of a rotary accumulator 1304 may be provided by pistons (hydraulic, pneumatic or otherwise) and/or linear actuators arranged to change their length. In this way, the speed at which containers 10 are loaded into carriages 2 may be varied by changing the length of the storage location relative to a centre of the rotary accumulator 1304. In this way, the circumferential speed of the rotary accumulator 1304 may be varied at different locations on the radius thereof. Moreover, variable radii of the storage locations permits installation of the rotary accumulator 1304 in reduced space locations by allowing installation of the rotary accumulator 1304 around other equipment. In one example, a conveyor 1301 may be served by a storage location with a reduced speed achieved by extending a storage location from a centre rotation of the rotary accumulator 1304. Accordingly, the conveyor need only match speeds with the reduced speed of the rotary accumulator 1304 when collecting a container 10. However, a higher speed track 5 (carrying higher speed carriages 2) may be used to receive the container 10 by causing the storage location to reduce in radius from a centre of the rotary accumulator 1304. In this way, the speed of the storage location necessarily increases due to the reduced radius. In this way, the speed of the storage location may be varied between receiving a container 10 from a conveyor and depositing the container 10 in a carriage 2, without changing the speed of rotation of the rotary accumulator 1304.

Figure 14:
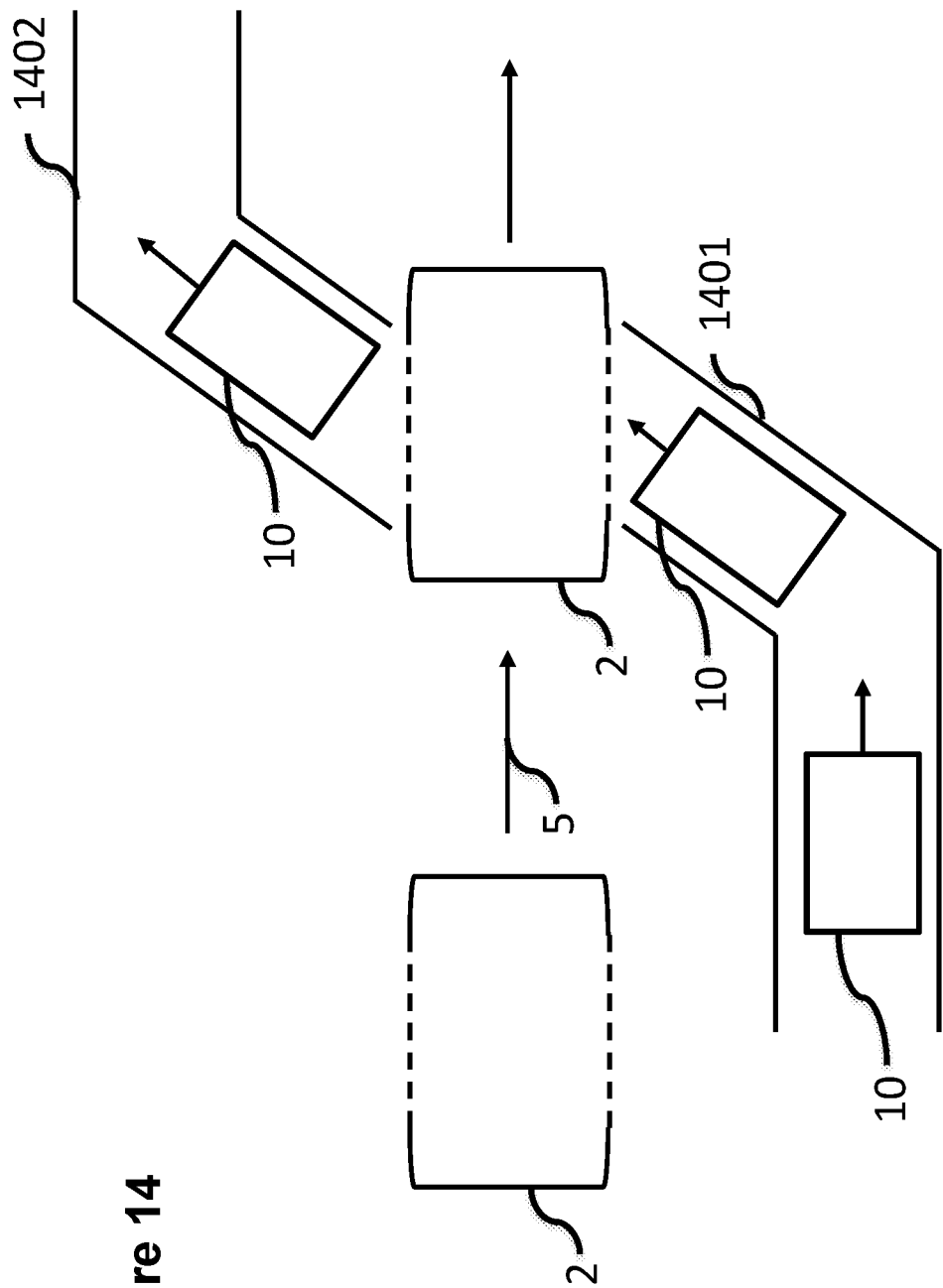
FIG. 14 is a schematic diagram showing a fifth example of loading a container onto a carriage according to the second embodiment of the present invention.

FIG. 14 shows a fifth example of the second embodiment. In this example, carriages 2 (such as Magway carriages) are kept moving on a track 5 whilst loading of containers 10 is performed. In particular, the carriages 2 are loaded from the side as depicted in FIG. 14 as a dotted line. In this way, containers 10 may be quickly loaded and unloaded from carriages 2 without requiring the carriage 2 to stop. To achieve this, an input conveyor 1401 is provided arranged to shape the flow of incoming carriages 10 such that each carriage 2 is loaded with one container 10. Preferably, the container 10 is gently loaded onto a carriage 2. To achieve this, the slope of the input conveyor 1401 is optimally kept at a low angle relative to the direction of travel of the carriage 2, however, this increases the length of input conveyor 1401 required. As shown in FIG. 14, the input conveyors 1401 is arranged to move containers 10 to a point of loading into a carriage whilst also directing the orientation of each container 10 to ensure optimal loading into the carriage 2.

To achieve loading of the carriage 2, it is envisaged that each carriage 2 has a gap in the side wall thereof to permit entry of the container 10. Alternatively, the side wall may be moveable to permit loading of the container 10 into the carriage 2 and to then relocate to cover the gap once the container 10 has been loaded. Alternatively, when the carriage 2 is implemented without any side wall, e.g. as a tray, then no gap is needed. The gap in the side wall/moveable wall is depicted in FIG. 14 as a dotted line. Optionally, the carriage 2 may be provided with a lid (not shown) which may be permanently installed on top of the carriage 2 or may be installed automatically after the loading of the container 10 into the carriage 2. The lid may be used to prevent items in the container 10 from being displaced from the carriage 2 during transit.

FIG. 14 further depicts the unloading of container 10 from a carriage 2. To achieve this, an output conveyor 1402 is provided to quickly transport a container 10 from the carriage 2. The output conveyor 1402 and/or the carriage 2 may be provided with means to remove a container 10 from the carriage 2. For example, a levering mechanism may be provided on the carriage 2 which is triggered by the output conveyor 1402 to cause the output of the container 10 from the carriage 2. Alternatively, the carriage 2 may further comprise conveying means to discharge a container 10 from the carriage 2. For example, chain drives, conveyor belts of the like may be mounted inside the carriage 2 and arranged to output a container 10 from the carriage when required. In this way, the conveying means becomes part of the carriage 2.

As shown in FIG. 14 the carriage 2 is provided with a gap in the side wall thereof (depicted as a dotted line) to permit the egress of the container 10 from the carriage 2. As described previously, it is envisaged that the carriage 2 may further comprise a moveable wall which is relocated to permit a gap in the carriage 2 when it reaches the output conveyor 1402 and which is relocated to cover the gap when the carriage is moved on from the output conveyor 1402. Alternatively, the carriage 2 may be provided as a tray with no substantially side walls. Therefore, no gap in a side wall is needed and unloading of the carriage 2 is more easily achieved. Optionally, when the carriage 2 comprises a removable lid (not shown) then a de-lidding process may be performed by which the lid (used to keep items inside the container 10 during transit) is removed prior to the unloading of the container 10 from the carriage 2.

Figure 15:
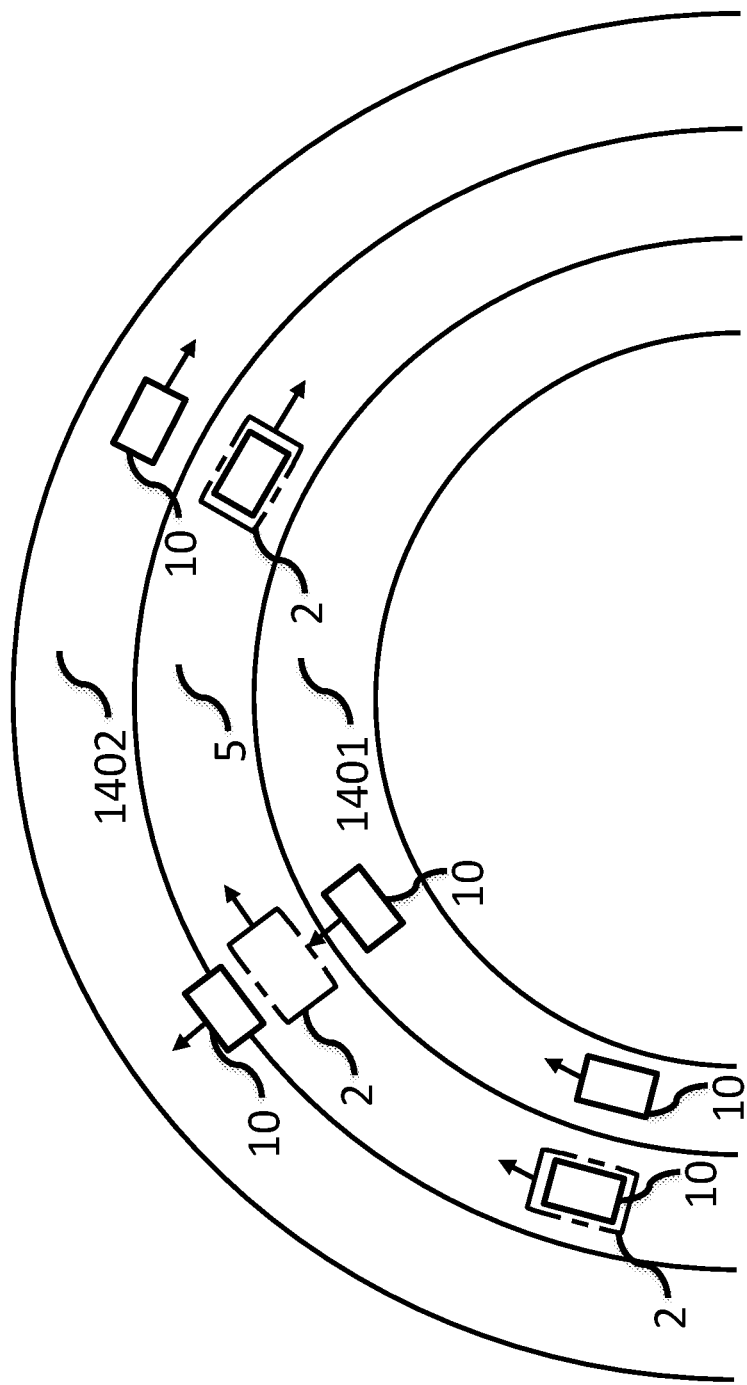
FIG. 15 is a schematic diagram showing further detail about the fifth example of the second embodiment of the present invention.

FIG. 15 shows a modification of the fifth example described above and shown in FIG. 14. In particular, in this modification, the track 5 has been arranged in a curved path with an input conveyor 1401 and output conveyor 1402 similarly arranged. In this way, centrifugal force as applied to the container 10 may be used to load/unload them from the carriage 2. For example, as shown in FIG. 15, as each container 10 progresses around the input conveyor 1401 it will tend to slip sideways due to the curvature of the conveyor. In this way, an empty carriage 2 positioned alongside and moving with the container 10 will be arranged to receive the container 10 moving on the input conveyor 1401. Similarly, a carriage 2 comprising a container 10 may be arranged to unload the container 10 onto the output conveyor 1402 by applying centrifugal force to the container 10 by way of the curved track 5. In this way, as the carriage 2 comprising the container 10 travels around the curved track 5, the centrifugal force will tend to pull the container 10 from the carriage onto the output conveyor 1402. In this way, the carriage may be unload/loaded without requiring to stop whilst also ensuring that the container 10 is loaded relatively gently into the container 10 which might otherwise damage its contents.

Figure 16:
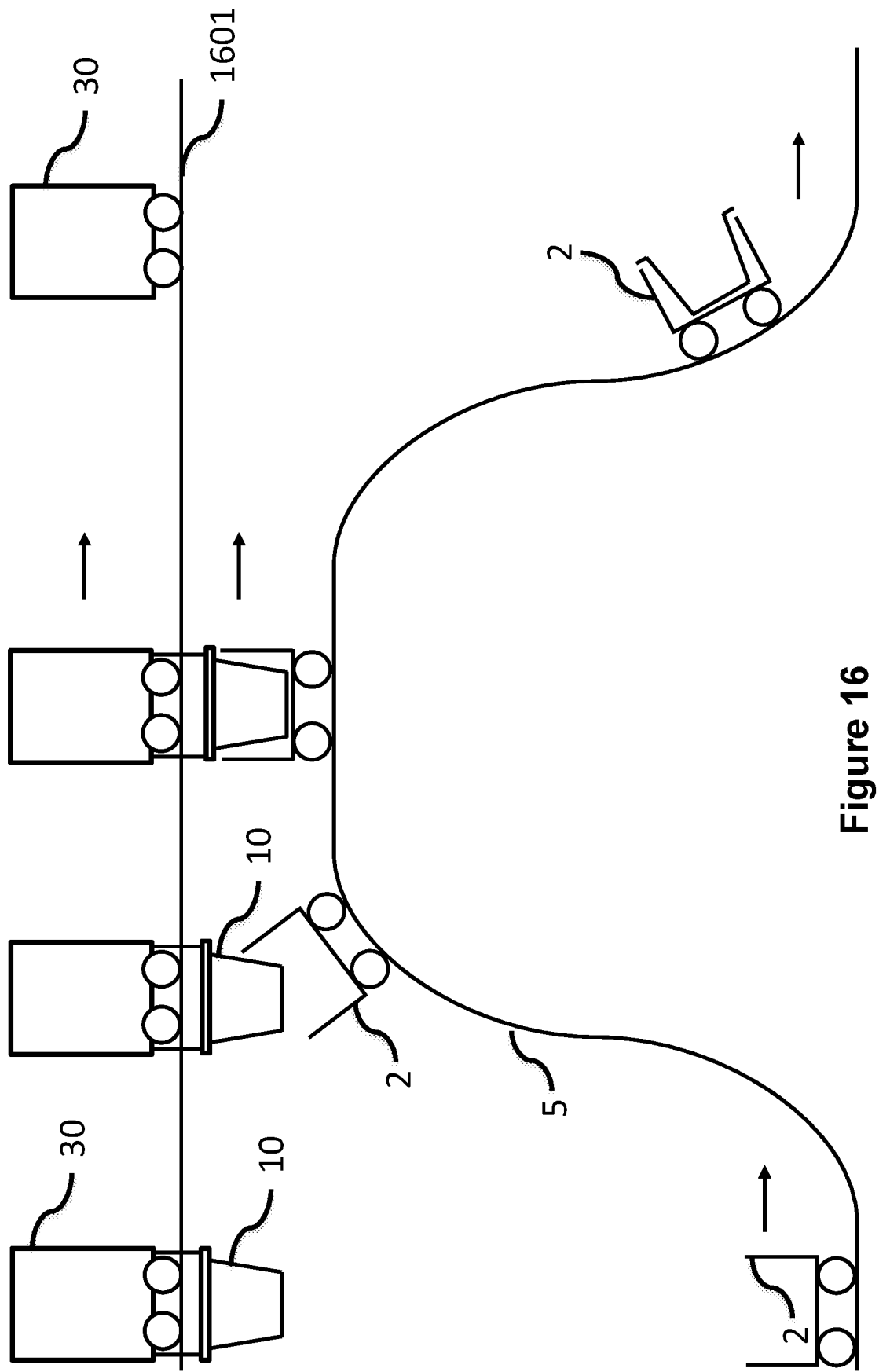
FIG. 16 is a schematic diagram showing a sixth example of loading a container onto a carriage according to the second embodiment of the present invention.

FIG. 16 depicts a sixth example of the second embodiment. In this example, similar to in the first embodiment, load handling devices 30 are used to load containers 10 into carriages 2 (such as Magway carriages). However, unlike the first embodiment, in the sixth example of the second embodiment the load handling device 30 is arranged to match velocities with the carriage 2 and therefore to load the container 10 whilst both the carriage 2 and load handling device 30 are moving. In this way, a significant increase in the speed and efficiency of loading a carriage 2 is obtained because the carriage 2 does not need to stop to be loaded. Similarly, when unloading a carriage 2 the load handling device 30 is arranged to match velocities with the carriage 2 and unload the container 10 from the carriage 2 whilst the carriage 2 and load handling device 30 are moving.

As shown in FIG. 16, a track 5 is arranged to transport carriage 2 in close proximity to a load handling device 30 on guides 1601. The guides 1601 may be similar to rails 22 shown in FIG. 5 and load handling device 30 may operate interchangeably on the rails 22 and the guides 1601. However, the guides 1601 are arranged to permit a load handling device 30 to move along the guides 1601 whilst lowering/raising a container 10. Therefore, the bracing shown on the rails 22, which would otherwise obstruct the load handling device 30 from raising/lowering a container 10, have been removed. Therefore, particular attention is paid to the rigidity and stiffness of the guides 1601 to prevent unwanted movement of the load handling device 1601 traversing the guides 1601.

The load handling device 30 may store a container 10 in a cavity until the container 10 is to be loaded into a carriage 2. FIG. 16 shows the track 5 comprising an elevated portion arranged to bring the carriage 2 closer to the load handling device 30. The elevated portion may also be used to speed match the carriage 2 with the load handling device 30 by slowing the speed of the carriage 2. Therefore, an empty carriage 2 traverses the track 5 and ascends the elevated portion of track 5 to be closer to the guides 1601 and the load handling device 30. At the same time, the load handling device 30 begins lowering the container 10. It may be advantageous to synchronise the lowering of the container 10 so that a first edge of the container 10 abuts against a first edge of the carriage 2 are the carriage 2 travels uphill of the elevated portion. In this way, the carriage 2 is successfully located within the carriage 2 accurately. At the top of the elevated portion the load handling device 30 completes the lowering of the container 10 and releases it. At this point, the container 10 is contained by the carriage 2 whilst the load handling device no longer has control of the container 10. The gripping mechanism used by the load handling device 30 to grip the container 10 may then be raised back towards the load handling device 30. A downhill portion of the track 5 may be used to reaccelerate the carriage 2 on the track 5 and move it further away from the guides 1601. The load handling device 30 may continue along the guides 1601 and transition to the rails 22 when appropriate. In this way, the load handling device 30 and the carriage 2 now proceed independently on their respective journeys.

In other words, the motion of the load handling devices 30 along the illustrated section of loading handing device 30 rail 1601 may be controlled to correspond to or substantially match the movement of corresponding carriages 2 along at least the final section of the first sloping section and/or the "top" of the hill, or vice versa. The loading handing devices 30 may be controlled to substantially continuously match the speeds of the carriages along the entire length of the illustrated rail, or to match the speeds along only limited sections of the rail, or vice versa.

Instead of using an elevated portion, it is envisaged that the carriage 2 enters the illustrated section at a location positioned closely to the rail 1601. In this way, the use of a hump shown in FIG. 16 is avoided. Therefore, control of the speed matching may be achieved by varying the speed of the carriage 2 on the track 5 and/or varying the speed of the load handling device 30 on the rail 1601. It is envisaged that the carriage 2 may be implemented as a tray rather than a carriage 2 with a cavity. Moreover, a lidding process may be implemented when the carriage 2 further comprises an optional lid. To this end, the lid may be automatically installed after loading the carriage 2 with the container 10. Moreover, prior to loading the carriage 2 a de-lidding process may be implemented to remove the lid.

It may be preferable for the loading handing devices 30 to move as they deposit or retrieve containers 10, as this may allow a greater through-flow of containers 10—the loading handing devices 30 would otherwise need to accelerate away from the point at which the containers 10 are deposited/retrieved, which would potentially delay the point at which another loading handing device 30 could occupy the necessary space.

A loading handing device 30 and a carriage will be aligned with one another in such a way and for a sufficient period of time that the loading handing device 30 can deposit a container 10 into or collect a container 10 from the carriage below. Thereafter the loading handing device 30 and the carriage may travel independently of one another, e.g. to different locations and/or in different directions.

The illustrated loading handing device 30 track may in some examples be one length or row of a grid. As shown in FIG. 5, the grid comprises multiple stacks of containers 10 arranged in a grid structure 14 comprising vertical grid members 16 and horizontal grid members 18, 20. The top of the grid 1 includes rails 22 which are arranged into a first set of parallel rails 22a and a second set of parallel rails 22b running transversely to the first parallel rails 22a. The loading handing device 30 track may for example be one length or row of the grid 1. That length or row of the grid 1 may have the illustrated carriage track beneath it instead of stacks 12 of containers 10. That particular length or row of the grid 1 may be have been modified, e.g. to omit the first set of parallel rails 22a or the second set of parallel rails 22b to allow the loading handing devices 30 to lower containers 10 while moving along the remaining rails. The loading handing device 30 track and corresponding carriage track may be along an outer edge of the grid 1, or may pass through the grid 1 closer to the centre of the grid 1, or pass through the centre of the grid 1.

This arrangement may advantageously allow containers 10 which are stored in the grid 1 to be transported away from the grid, e.g. to a dispatch location where the containers 10 can be loaded onto a delivery vehicle, or even directly to a destination, in a convenient, efficient and substantially automated way. Some embodiments may for example include termination means at the end of a carriage track which allows one or more carriages and/or one or more containers 10 which have been conveyed along the carriage track to be loaded directly onto a delivery vehicle such as a lorry or van. For example, a carriage may travel along the track into a delivery vehicle. Where a container 10 has been removed from a carriage, the carriage may then leave the vehicle. Alternatively, the carriage may stay in the vehicle and travel onwards with the vehicle.

Conversely, the arrangement may allow containers 10 which need to be stored in the grid 1 to be brought to the grid, in carriages or otherwise, and then retrieved by one or more loading handing devices 30, which lift the containers 10 into the grid for storage.

A container 10 may be lowered by a loading handing device 30 from the loading handing device 30 track into a carriage which conveys the container 10 away or onto a conveyor which conveys the container 10 away, e.g. a conveyor, which may then convey the container 10 into a carriage or onto another conveyor. Conversely, the container 10 may be raised, by the loading handing device 30, from a conveyor or from a carriage.

Figure 17:
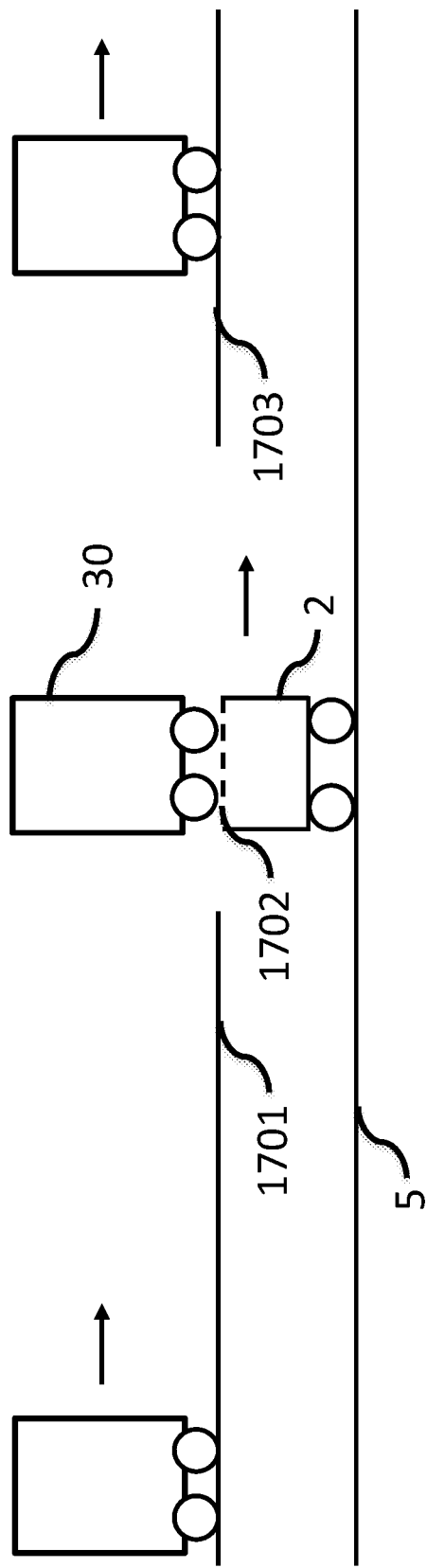
FIG. 17 is a schematic diagram showing further detail about the sixth example of the second embodiment of the present invention.

FIG. 17 shows a modification to the sixth example of the second embodiment. In this modification, the carriage 2 comprises a guide 1702 arranged on a top edge thereof, corresponding to the location at which the container 10 is loaded/unloaded to/from the carriage 2. In this way, the load handling device 30 may traverse a first guide 1701 arranged similar to the guide 1601 shown in FIG. 17. In this example, the guide 1601 may also correspond with the rails 22 shown in FIG. 5. In this modification, the container 10 is not lowered through the rails 22/guide 1601 therefore, bracing similar to that of FIG. 5 may be used where appropriate. The first guide 1601 may be used to ensure that the carriage 2 and load handling device 30 substantially match velocities. It is envisaged that the first guide 1701 ends in such a location that as the transporting device 30 leaves the first guide 1701 it simultaneously moves on to the guide 1702 located on the top edge of the carriage 2. In this way, the weight of load handling device 30 is carried by the carriage 2 and the carriage 2 moves the load handling 30 together with the carriage 2. In this way, the velocities of the load handling device 30 and the carriage 2 become matched. The load handling device, now sitting on a moving carriage 2 is able to perform the action to load/unload the container 10 to/from the carriage 2. It is envisaged that the load handling device 30 will be required to apply brakes or the like to its movement as it leave the first guide 1701 and transitions onto the guide 1702. In this way, the relative velocity between the carriage 2 and load handling device 30 becomes zero.

A third guide 1703 is arranged a distance away from the first guide 1701 such that after loading/unloading the carriage 2 the load handling device 30 is arranged to accelerate and travel off of the carriage 2 and continue onto the third guide 1703. In this way, the load handling device 30 and the carriage 2 can continue on independent paths. Moreover, by including a guide 1702 on the top edge of the carriage 2 then loading/unloading of a container 10 can occur whilst the both the carriage 2 and load handling device 30 are moving. Optionally, the track 5 may include the elevated portion shown in FIG. 16 so that the carriage 2 decelerate as it travels uphill engineered such that at the top of the elevated portion the carriage 2 and the transporting device 30 are matched in velocity.

Figure 18:
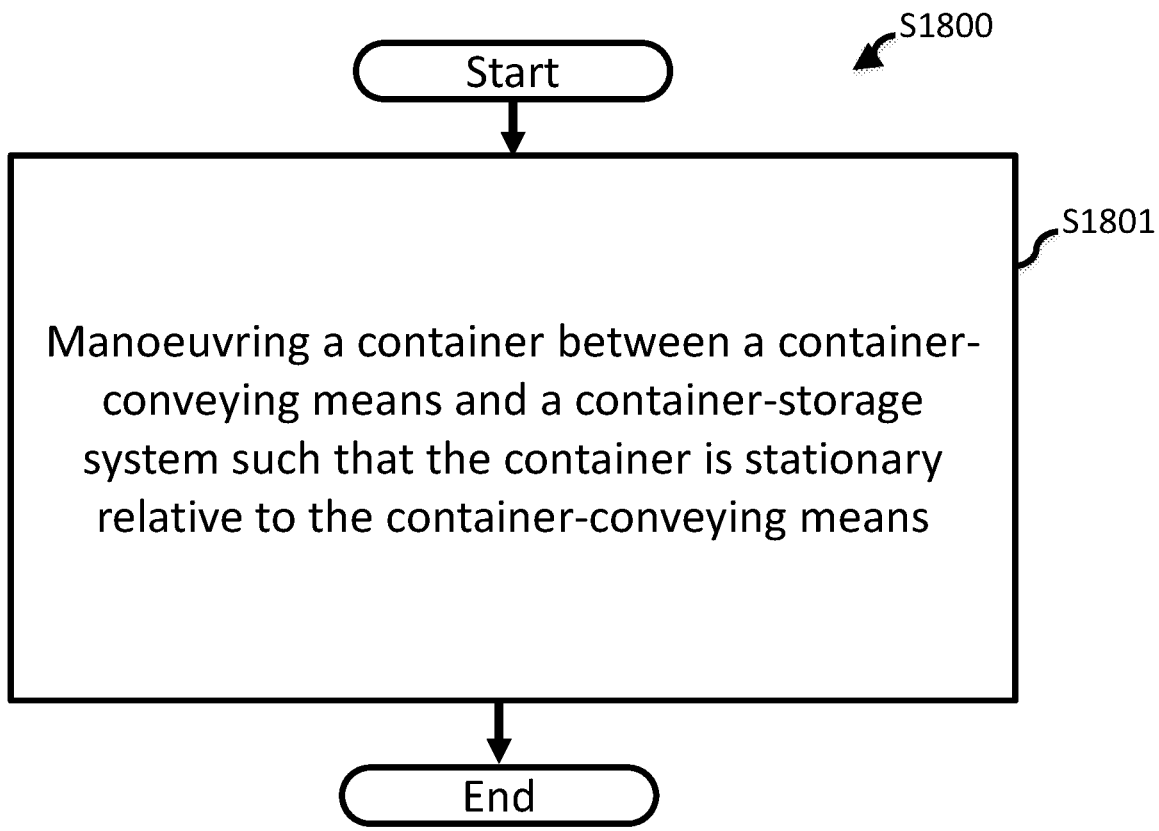
FIG. 18 is a flowchart of the processes performed by the first embodiment of the present invention.

With regard to FIG. 18, there is depicted a flowchart of the operations performed by the first embodiment of the present invention. In particular, the flowchart S1800 comprises a first step S1801 of manoeuvring a container between container-conveying means and a container-storage system such that the container is stationary relative to the container-conveying means. In this regard, the container 10 is moved from a stationary storage system to a stationary conveying means (such as a Magway carriage 2). Preferably, this is performed using a load handling device 30 on a grid-like set of rails, as described in relation to the first embodiment of the present invention.

Figure 19:
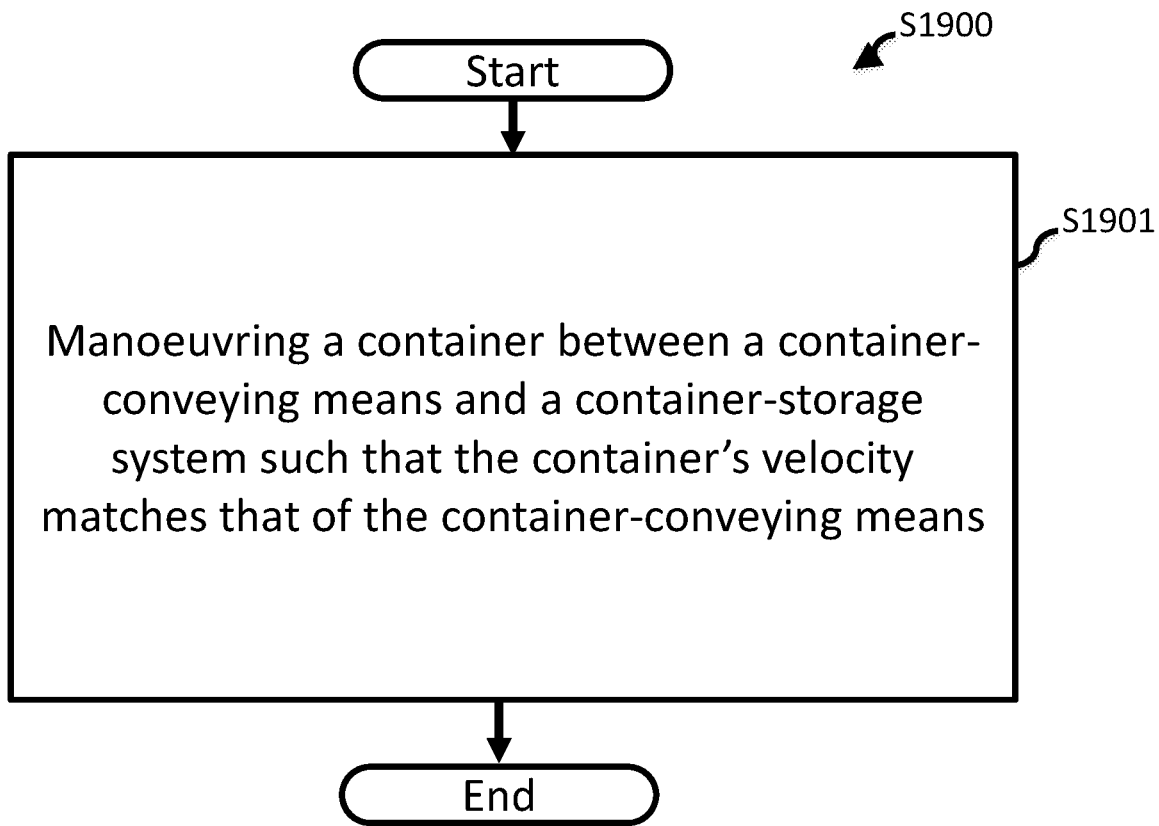
FIG. 19 is a flowchart of the processes performed by the second embodiment of the present invention.

With regard to FIG. 19, there is depicted a flowchart of the operations performed by the second embodiment of the present invention. In particular, the flowchart S1900 comprises a first step S1901 of manoeuvring a container 10 between a container-conveying means and a container-storage system such that the container's velocity matches that of the container-conveying means in accordance with the second embodiment of the present invention. Advantageously, this permits a quicker and more efficiency loading/unloading of a container 10 from a carriage 2.

Modifications and Variations

Many modifications and variations can be made to the embodiments described above, without departing from the scope of the present invention.

In any embodiment including a carriage track 5, the carriage track 5 may be any kind of track or other structure on or along which carriages may travel. For example, it may be a railway-style track (e.g. having two parallel rails which wheels of a carriage may rest on); a monorail-style structure (e.g. having a single supporting rail on which a carriage may be supported); a magnetic support and/or conveying structure (the carriages having corresponding components to enable the carriages to move along the magnetic support structure), such as a Magway conveying mechanism; or any other suitable structure or means along which carriages can move. Accordingly, any corresponding type of carriage may be appropriate for the purposes of the above-described embodiments. A carriage may for example include one or more wheels or other carriage bearing and/or supporting means, such as magnetic carriage supporting means configured to interact with the magnetic support structure discussed above, or a recess and/or bearing arrangement configured to receive a monorail-style structure.

The illustrated conveyors may take any suitable form capable of conveying containers. For instance, in some embodiments, a roller, belt or other form of conveyor may be used. In other embodiments, a magnetic container-conveying mechanism may be used, such as a Magway conveying mechanism. As described above, non-powered conveyors may also be used for at least some sections of conveyor in some configurations.

The containers in the illustrated examples may be suitable for conveying on one or more of these multiple different types of conveying means. For instance, a container 10 may be conveyable on a traditional roller or belt conveyor and also on a magnetic container-conveying means such as a Magway conveying mechanism. The container may be able to transition between the two types of conveyor without alteration or additional manipulation of the container.

Advantageously, this may mean that, in at least one embodiment, carriages and a carriage track are not required for conveying containers away, e.g. from a grid. In such an embodiment, a container 10 may be transported along a magnetic container-conveying mechanism for part of its journey and along another container-conveying mechanism (such as a belt conveyor) for another part of its journey. This may for example enable containers to be conveyed into and out of a grid that has existing conveying means at container ingress and egress points. In such a configuration, a container 10 may be delivered to the container ingress point of the grid on a magnetic container-conveying mechanism and may transition, either directly or indirectly, from the magnetic container-conveying mechanism to the existing conveying means at the container ingress point. The container will then be processed as it would be in any other circumstance. It may for example be collected from the conveyor of the container ingress point by a load handling device 30 or by another means and put into a stack in the grid for storage.

Conversely, a container which is stored in the grid may be retrieved by a load handling device 30 and placed on an existing conveyor which leads containers to a container egress point. The container may transition, either directly or indirectly, from the existing conveyor to the magnetic container-conveying mechanism, which may convey the container away from the grid, e.g. to a delivery vehicle or directly to a customer.

In some embodiments, load handling devices may be provided which can lift a carriage off a track, rather than or in addition to being able to lift a container out of a carriage. For example, a carriage and a load handling device may be configured such that the carriage fits within a cavity of the load handling device and can be lifted off the corresponding track by appropriate raising and/or lowering means forming part of the load handling device. The raising and/or lowering means may be similar in configuration to the raising and/or lowering means discussed above in the context of raising containers out of and lowering containers into carriages, but with any reconfigurations necessary to enable the raising and/or lowering means (particularly the gripping assembly of the raising and/or lowering means) to grip the carriage. It may be preferable for the raising and/or lowering means to be able to engage a carriage or a container, i.e. to be capable of gripping either, for greater flexibility. In embodiments in which a carriage is configured to fit within a cavity of a load handling device, the carriage may still accommodate a container within which one or more items are placed, or the cavity of the carriage may be configured to receive one or more items directly. In the latter case, containers may not be required—all items to be stored and transported may be stored and transported directly inside the cavities of carriages rather than in a container which is placed inside the carriages' cavities. This may for example happen at a picking station which is part of or positioned in the vicinity of the grid 1. The carriages may be brought to the picking station for items to be placed inside the cavities. The carriages may then be moved away from the picking station, e.g. to a carriage track for the carriages with their items to be conveyed away.

The grid and the grid's ancillary machinery (such as any container ingress and egress equipment, loading handling devices, etc.) may be capable of accommodating (or capable of being modified to accommodate) carriages. In such cases, the carriages may be manoeuvred around the grid 1 by the loading handling devices (or otherwise), and items may be placed inside a container with the container already inside the carriage (or inside the carriage cavity directly, with no container). The carriage and the items within may then be manoeuvred onto a carriage track (such as a Magway track or other form of magnetic carriage track) and conveyed away from the grid by the carriage track. Conversely, a carriage may be brought towards the grid along the carriage track, manoeuvred off the track and then stored in the grid, by loading handling devices or otherwise. Items may be removed from within the carriage before the carriage is stored, and/or items may be added to the carriage before the carriage is stored (into or out of a container or the carriage cavity directly if there is no container inside the carriage).

An alternative storage and retrieval structure (instead of or in addition to grid 1) may be provided which is configured to store and retrieve carriages, while the grid 1 remains configured to store and manoeuvre containers. Alternatively, one or more parts of the grid 1 may be configured for storing and retrieving carriages and one or more other parts of the grid 1 may be configured for storing and retrieving containers. The loading handling devices may be capable of transferring a container into a carriage which is stored in the grid, or removing a container from a carriage which is stored in the grid, and other manoeuvres of the containers and carriages.

Figure 1:
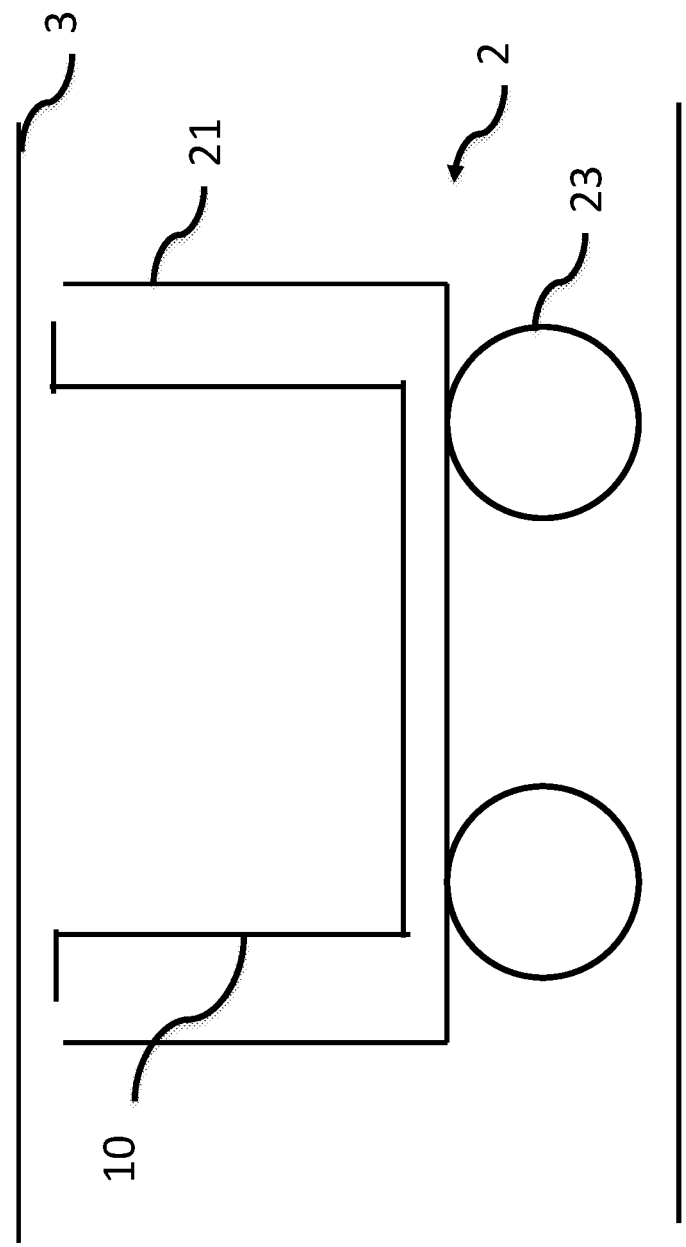
FIG. 1 is a schematic diagrams of a known container transport system utilising a carriage for transport of individual container.

A carriage arranged to transport a container faces the problem of sufficiently containing a container 10 to prevent movement of the container 10 during transport in a body 21 of a carriage 20. Although FIG. 1 depicts this problem with regard to a Magway carriage, the same problem faces carriages used in lorries, vans, trains etc.

To this end, it is envisaged that the body 21 of the carriage 20 may comprise clamping means such as magnets, electrically operated clamps, mechanically activated latches, sticky pad, Velcro and the like to secure a container 10 in the carriage 2.

Moreover, the body 21 may further comprise a lid and/or sliding door to secure the container 10 which advantageously avoids contamination of the container 10 from the environment, tampering and temperature. For example, the container 10 may include items which require a chilled environment which could be maintained inside the carriage body 21 through the use of a lid/door.

Moreover, although the carriage is envisaged to be passive and therefore not require power for locomotion, this need not be the case. For example, where the carriage is a lorry then power may be easily provided to the container 10. For example, the power could be used for sensors, monitoring, logging, communication, baking, cooking, brewing, growing, lighting or any other container-based, power consuming activity. The power could come from a battery hosted on the carriage 2, directly from wheels using a dynamo, if present on the carriage 2 and/or using inductive power transfer from, for example, the track 5.

Communications could be used to synchronise or obtain information regarding the carriage 2 such as temperature, chilling, errors, vibration and other monitoring data points or identifiers to or from the carriage 2 and/or container 10.

The container 10 may be a tight fit in the body 21. In this way, the container 10 is sufficiently contained in the body 21 to prevent unwanted movement of the container 10 in the body 21 which may damage items in the container 10.

However, when a container 10 is placed or removed from the body 21 air can be trapped between the container 10 and the body 21. As a result, it may becoming difficult to insert/remove the container 10 from the body 21 due to the air cushion.

Figure 20A:
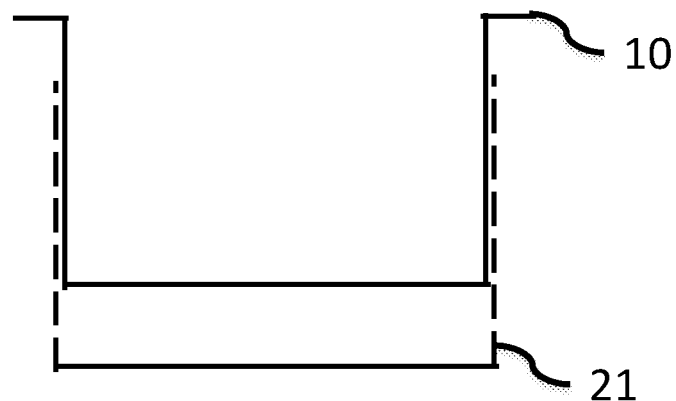
FIGS. 20a and 20b are schematic diagrams of carriage to container interfaces according to an embodiment of the present invention.

FIG. 20*a* shows one example to solving the problem of trapped air by the body 21. In particular, the body comprises holes at varying locations such that the container 10 can be added/removed from the body 21 and the trapped air is able to escape the body 21. Moreover, by locating holes at varying locations of the body 21 then as the container is added to the body 21 then holes are progressively blocked by the container 10. Therefore, air escapes from the body 21 at a progressively slower rate causing a cushioning effect causing the container 10 to decelerate.

Figure 20B:
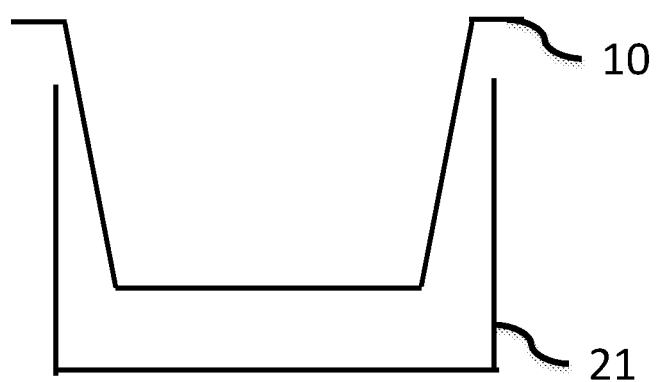

Additionally or alternatively, as shown in FIG. 20*b* the walls of the container 10 and/or the body 21 may be tapered so as to achieve the same effect as in FIG. 20*a* of reducing air flow as the container 10 enters further into the body 21. In this way, the gradual acceleration/deceleration of the container 10 in the body 21 reduces the risk of damage to items in the container 10.

In other words, the illustrated carriages' cavities (or receptacles) may include one or more features to help control the manoeuvring of the containers into or out of the cavities. For example, the cavity or receptacle of a carriage may include one or more air-release holes in the exterior walls of the cavity. The air-release holes may control how air escapes from a cavity of a carriage as a container enters the cavity or enters the cavity as a container is removed from the cavity, for example. The number and pattern of the holes may be configured to provide a desired level of cushioning, smoothing or resistance as a container enters or leaves a cavity. For example, more holes may be provided nearer the opening of the cavity, and fewer holes may be provided nearer the bottom of the cavity. This may cause an increasing deceleration or cushioning of a container entering the cavity, since there will be fewer holes for air to escape by when the container is most of the way into the cavity. Alternatively or additionally, the walls of the carriage and/or the container may be tapered or may include one or more protrusions, ribs or other positive features to help cushion or smooth movement of the container into or out of the carriage. The walls may have variable taper, e.g. more heavily tapered towards the bottom of the cavity or container, to help cause increased deceleration as the container nears the bottom of the cavity. These features may help minimise damage to one or more items in the container.

Figure 21A:
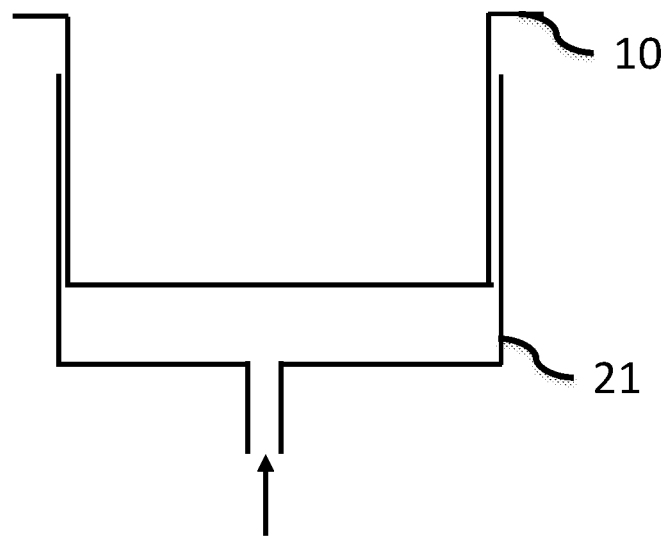
FIGS. 21a and 21b are further schematic diagrams of carriage to container interfaces according to an embodiment of the present invention.
Figure 21B:
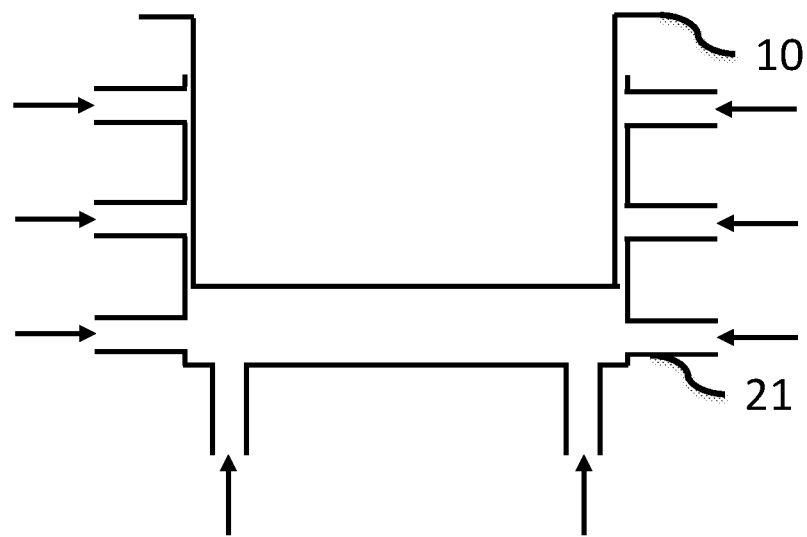

FIGS. 21*a* and 21*b* show an addition/alternative to the management of containers 10 as they are located in the body 21. In particular, in these examples, the air entering/leaving the body 21 is actively managed. In this way, containers 10 of differing weights can be handled. This may be achieved by mechanical means, for example, based on pressure sensitivity. Additionally or alternatively an electro-mechanical system such as based on various sensors and/or container 10 load information.

For example, regarding FIG. 21*a* to cause the expulsion of the container 10 from the body 21 air may be forced into the body 21 by way of an inlet pipe. This causes the container 10 to rise out of the body 21. Conversely, insertion of the container 10 may be achieved by sucking air out of the body 21 by way of a pipe. In this way, the container 10 is drawn into the body 21 and retained therein. In this way, the container 10 may be secured in the body 21 using air pressure alone.

Additionally or alternatively, as shown in FIG. 21*b* the body 21 may comprise a plurality of pipes. In this way, air flow into the body 21 can be regulated at a plurality of locations on the body 21 such that as the container 10 rises in the body 21 additional pipes are exposed thereby providing addition air infeed thus accelerating the expulsion of the container 10.

The airflow may be driven by dedicated hardware such as an electric pump or could be driven by surplus energy from another process such as a carriage 2 braking.

In other words, one or more pumps or other air-flow means may be provided to help provide decelerating or accelerating forces to containers in cavities of carriages as described above. For example air may be forced into a cavity of a carriage through one or more apertures or holes in the cavity wall. This may be used either to help force a container out of the cavity, as illustrated, or to help slow down a container which is entering the cavity. Conversely, air may be drawn out of a cavity through one or more apertures or holes in the cavity wall, e.g. to help a container enter the cavity if there is a strong interference fit between the container and the cavity walls.

The force or flow provided by the pump(s) may be controlled in dependence on one or more attributes of the container and/or the carriage/cavity. For example, the force/flow may be controlled in dependence on a weight of a container. This may be achieved using a mechanical system (e.g. based on pressure sensitivity) and/or an electromechanical system (e.g. based on various sensors and/or container load data). The force/flow may be controlled globally, such that approximately the same force/flow is applied at each aperture or hole, or may be applied locally, with at least two different forces/flows being applied at different apertures/holes. This may for example involve applying different forces/flows at different heights of hole in the cavity walls, to control a container's ascent out of or descent into a cavity. In embodiments where the apertures/holes are distributed over different heights, the force/flow may be changed as more holes are exposed (as the container rises) or holes are occluded (as the container falls).

Figure 22:
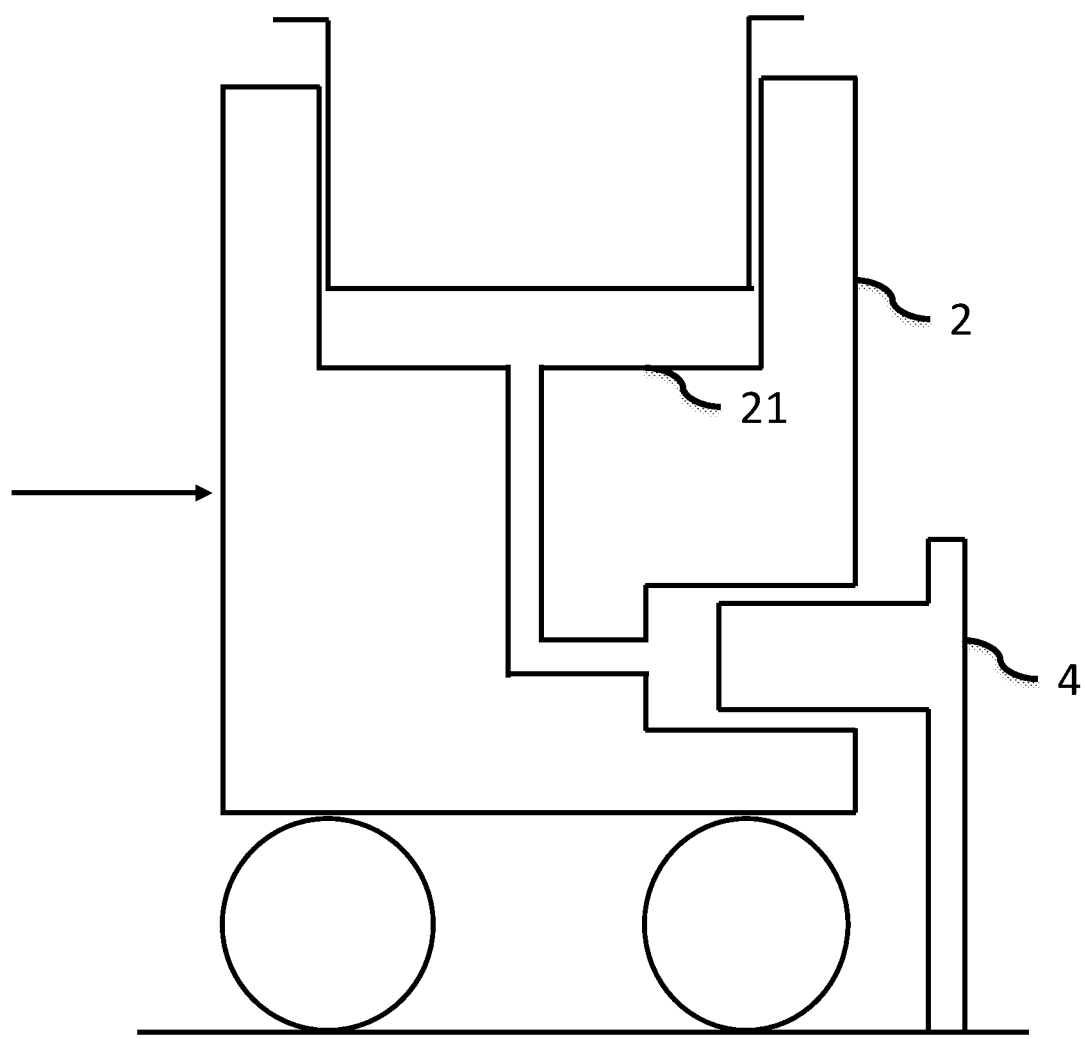
FIG. 22 is a further schematic diagram of carriage to container interfaces according to an embodiment of the present invention.

FIG. 22 shows another example of the removal of a container 10 from a carriage 2. In this example, the carriage 2 is stopped in its motion by a stationary piston 4 arranged to enter a pressure chamber linked to the body 21. In this way, as the carriage 2 comes to a stop air is forced into the body 21 thereby expelling the container 10.

In other words, there is shown a carriage in which a similar approach is used not only to help remove a container from a carriage cavity but also to decelerate the carriage as it moves along a carriage track. In the illustrated example, the carriage moves towards a buffer or piston, which is received into a corresponding chamber in the carriage. The insertion of the piston into the chamber causes air in the chamber to be forced through a linking duct to the cavity. The movement of the air into the cavity applies a force to the container to cause the container to move upwards, out of the cavity. In this example, the kinetic energy of the carriage is therefore converted into kinetic energy of the container, thereby efficiently reusing the carriage's initial kinetic energy. The container may then be collected, e.g. by a conveyor or bot, near the piston.

In some embodiments, carriages may include means for delivering electrical power to the cavity. Said means may for example enable an object within the cavity (such as a container or another object) to receive electrical power. This may advantageously allow one or more operations to be performed within the cavity. For example, it may allow any one or more of the following to operate within the cavity: cooling means, e.g. to cool one or more items located in the cavity; heating means, e.g. to heat one or more items located in the cavity; sensing or monitoring means, e.g. to detect one or more quantities (such as temperature or vibration) within the cavity or elsewhere, and/or to measure one or more properties in relation to the carriage (such as a speed, acceleration or health of the carriage) or in relation to items within the carriage (such as inspecting items within the carriage for damage); logging means, e.g. to log one or more sensed quantities or properties; and communication means, e.g. to communicate with a control unit for the carriage to enable synchronisation or control of the carriage, and/or to communicate with other carriages, and/or for information (e.g. recorded by the sensing or monitoring means and/or logged by the logging means) to be communicated to an external receiving means. This may for example include chilling equipment statistics; errors; vibration; and other monitoring data points or identifiers. This may be communicated between the interior of the cavity and the carriage, and/or from the carriage to an external receiving means.

One or more of the above means may be used, possibly in conjunction with one another, to enable one or more different operations to be performed within the cavity, e.g. on items in the cavity. For example, they may enable baking or cooking of foodstuffs; brewing or treating of drinkable produce; growing or cultivating of vegetation, livestock or other living organisms; lighting of the cavity; or another activity which needs power, to be performed within the cavity of the carriage. One or more sensed parameters or quantities relating to those operations (such as a temperature, health of a respective item or means, or other data) may be communicable to an external receiving means using the communication means. This may for example enable the operation to be controlled externally to the carriage. Alternatively, the carriage may include one or more controllers configured to control such operations.

The means for delivering electrical power may for example be or include a plug-and-socket arrangement; a contact-based or wireless charging arrangement or pad (which may be configured to interface with a corresponding arrangement or pad on a container or other object configured to be placed within the cavity); and/or associated cabling. In some embodiments, the carriage may additionally include a source of electrical power, such as a battery or capacitor hosted on the carriage. In other embodiments, the means for delivering electrical power may be connected to an external source of electrical power, e.g. one or more powered rails and/or dynamos (e.g. on wheels of the carriage).

Advantageously, carriages and carriage tracks which can convey items (either within containers or within the cavities of the carriages directly) as described and illustrated may make possible more sophisticated, versatile or flexible logistics. For example, the carriages and carriage tracks may reduce the cost, time and complexity of moving items between locations. This may allow items to be accumulated in one or more different locations before they are sent to their ultimate destination. For example, a requested set of items (e.g. an order placed by a customer) may include a first group of items which are currently available at a first location (such as a warehouse or fulfilment centre) and a second group of items which are not currently available at the first location. The first group of items may be sent, using the carriages and carriage tracks, to a second location (such as local depot or warehouse) which may for example be closer to the ultimate destination of the set of requested items. The first group of items may be stored at the second location. When the second group of items becomes available—at the first destination or elsewhere—the second group of items may be sent, using carriages and carriage tracks, to the second destination, where they may be combined with the first group of items, ready for dispatch to the ultimate destination. The items may be stored at the second location in one or more carriages (e.g. the carriage(s) that brought the items to the second location), in one or more containers (e.g. container(s) in which the items were brought to the second location), and/or otherwise. This approach may allow more flexibility and/or greater throughput of items at different locations, which may be advantageous in some situations.

In this document, "container" may also be referred to as "tote", generally though not necessarily with rigid sides, in which one or more items can be placed to enable those items to be more easily stored and/or transported. A container may be particularly suited to use in a storage and retrieval system. A container may in some embodiments have a substantially fabric body, with one or two pairs of parallel bars or rails defining top edges of the container, by which the container can be supported lifted and/or supported.

It is envisaged that a container 10 may be a stackable container in that a container may form stacks with other containers. For example, within the system described with regard to FIG. 2. Alternatively, the container may be a nesting container in that empty containers interact with each other to compact within one another. For example, the container described with regard to FIG. 20b comprising tapered sides would cause empty containers 10 when placed on top of each other to nest into each other thereby reducing the space occupied by them. It is envisaged that, depending on the application, stackable or nestable containers 10 may be used where appropriate. Moreover, it is envisaged that containers 10 may comprise mechanisms to fulfil both functions by comprising extendable supports or the like arranged to translate a nestable container 10 into a stackable container and vice-versa.

It is envisaged that one or more components from one of the described and illustrated arrangements for manoeuvring containers may be included in another arrangement for manoeuvring containers, either to replace existing features or to supplement existing features.

With regard to the fourth example of the first embodiment of the present invention comprising containers 10 forming a cluster 8 of a reconfigurable topology, it is envisaged that this fourth example may be modified in line with the teaching of the second embodiment such that the container 10 is moved through the cluster 8 in a manner to match velocities with the carriage 2. In this way, the carriage 2 may be loaded with the container 10 in a manner which leads to more efficient and quicker loading the carriage 2 because the carriage 2 need not stop to be loaded with the container 10. In particular, the container 10 may be propelled through the cluster 8 by way of interaction with other containers 10 so that the speed of its movement matches that of the carriage 2 travelling on a track. Once the speeds match then the container 10 may be loaded onto the carriage 2. It is envisaged that a reverse process may be used to unload the carriage 2.

As has been described previously, the carriage 2 may comprise side walls and thereby form a cavity into which the container 10 is placed for transit. Alternatively, the carriage 2 may be implemented as a tray with no substantial side walls. The use of a tray-like carriage may have particular advantages such as aided the loading/unloading of the carriage 2. For example, with regard to the systems described with regards to FIGS. 7, 8, 9, 13, 14, 15 and 16 it may be preferred to use a tray-like carriage 2 because its use makes side-loading/unloading of the carriage (i.e. loading a container 10 into the carriage 2 from the side rather than the top) easier.

One or more of the arrangements described above may therefore provide an interface between a container-conveying means (e.g. a magnetic support and/or conveying structure, mechanism or means, such as the Magway carriage and track configurations illustrated in the accompanying drawings) and a storage and retrieval system, such as that described and illustrated in PCT/GB2014/052273 or PCT/GB2013/051215, for example, the contents of both of which are hereby incorporated by reference. In particular, the illustrated arrangements may allow a container to transition from a conveyor or other conveying means forming part of or connected to the container storage and retrieval system, to a separate container-conveying means, or vice versa. The arrangements may also be used in conjunction with other forms of storage and retrieval system, such as a storage and retrieval system incorporating components provided by manufacturers such as Autostore™, Cimcorp™, Knapp OSR™, Dematic Multishuttle™ and/or others.

It is further envisaged that the carriage 2 may utilise a track for guidance, support and/or locomotion. Such a track may span great distances between warehouse, facilities, homes, factories, distribution centres and the like. Optionally, the track may be used within the warehouse to provide the same guidance, support and/or locomotion used outside of the warehouse. However, it is envisaged that the track does not enter the warehouse and instead to provide the support, guidance and/or locomotion around the warehouse another means is used. For example, a conveying means such as a conveyor belt may receive the carriage 2 from its track on entry into the warehouse and then convey the carriage 2 to the required loading/unloading locations in the warehouse as described with regards to the first and second embodiments. In this regard, the term "track" as referred throughout this description is envisaged to encompass both a track used outside and inside of a warehouse and also a separate conveying means arranged to convey the carriage 2 around the warehouse. Advantageously, by using a separate conveying means with regards to the second embodiment, velocity matching between a conveyor 11 and the conveying means is more easily achieved. For example, the conveying means and the conveyor 11 may be mechanically linked so that the speed of the conveying means is automatically matched with the speed of the conveyor 11.

With regards to the system described regarding FIG. 7, it is envisaged that the carriage 2 may be arranged to move similar to the systems described in the second embodiment. This may be achieved by creating a wider area for the insertion/removal of container 10 into/from the carriage 2. Optionally, this may be achieved using an Intralox Activated Roller Belt sortation system which provides the advantage of putting more than one container 10 onto the same carriage 2.

Optionally, each carriage 2 may further comprise a lid arranged to prevent items from leaving the container 10 during transit. In this way, the container 10 is transported in a controlled/sealed carriage 2. In the example of a tray-like carriage 2, then the lid may be provided in an inverted cup-style to provide a sealed environment from the container 10 and its payload. This may be advantageous because it allows for the control and/or monitoring of the environment in the container 10. For example, the environment may need to be cooled or may stored hazardous materials (such as batteries). In this way, the environment found within the tray-like carriage and/or the lid may be controlled.

Therefore, when the carriage 2 is being loaded/unloaded from the top then a lidding/de-lidding apparatus needs to be provided. In this regard, prior to loading the carriage 2 the de-lidding apparatus may be arranged to remove the lid from the carriage 2 to provide access to the container 10. Similarly, after loading then the lid may be installed by a lidding apparatus ready for transit of the container 10 in the carriage 2. At the destination the lid may again be removed and container 10 removed before the re-installation of the lid.

Although the preceding description gives the specific example of Magway carriages 2, it is envisaged that other tube-based carriage 2 would benefit from the loading and unloading techniques disclosed herein. Therefore, Magway is to be taken as an example only of a tube-based carriage 2.

In this document the word "comprise" and its derivatives are intended to have an inclusive rather than an exclusive meaning. In other words, "a comprises b" is intended to mean that a includes at least b and may but need not necessarily include another component (including a second b).

The word "mount" and its derivatives are intended to include both direct mounting (i.e. with no intervening components) and indirect mounting (i.e. with one or more intervening components). Thus "a is mounted on b" is intended to include the possibilities that a and b are directly connected to each other and that a and b are indirectly connected to each other, with one or more intervening components being positioned between a and b such that a and b are not in direct contact, for example.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A system comprising:
   a container-storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces;
   a framework structure located beneath the rails with a plurality of stacks of containers located within the framework structure and arranged such that each stack is located within a footprint of a single grid space,
   a transporting device, the transporting device being arranged to selectively move in the X and/or Y directions, above the stacks on the rails and arranged to transport a container;
   one or more carriage tracks located beneath the framework structure;
   one or more carriages arranged to move along a carriage track wherein, in use, the transporting device is arranged to load/unload a container onto/from a carriage,
   wherein the carriage includes a first aperture arranged such that the transporting device may load/unload a container onto/from the carriage, and
   wherein the carriage includes a second aperture, the second aperture being opposed to the first aperture, the carriage being arranged such that a second container may be unloaded/loaded from/onto the carriage as the transporting device loads/unloads a first container onto/from the carriage.

2. The system according to claim 1, wherein the transporting device has a footprint that occupies only a single grid space in the storage system, such that a transporting device occupying one grid space does not obstruct a transporting device occupying or traversing the adjacent grid spaces in the X and/or Y directions.

3. The system according to claim 1, wherein the transporting device is arranged to load/unload a container onto/from the container-conveying means when the transporting device is stationary relative to the first and second set of parallel rails and stationary relative to the carriage.

4. The system according to claim 1, wherein the transporting device is arranged to directly load/unload a container onto/from a carriage.

5. The system according to claim 1, wherein system further comprises a robotic load handling device, the transporting device being arranged to load a container onto/from the robotic load handling device such that the robotic load handling device can load/unload the container onto/from the carriage.

6. The system according to claim 1, wherein the container and the carriage comprise a unitary construction such that the carriage may be arranged within a stack of containers by the transporting device.

7. A carriage for use with the system of claim 1, wherein the carriage comprises a cavity arranged to receive a container.

8. A method of manoeuvring a container, the method comprising the step of manoeuvring a container between a system and a carriage according to claim 6.

9. The method according to claim 8, wherein the method comprises the step of the transporting device loading a container onto the carriage.

10. The method according to claim 9, wherein the method further comprises the step of the transporting device retrieving the container from one of the plurality of stacks of containers before loading the container onto the carriage.

11. The method according to claim 8, wherein the method comprises the step of the transporting device unloading a container from the carriage.

12. The method according to claim 11, wherein the method further comprises the step of the transporting device storing the container in one of the plurality of stacks of containers after unloading the container from the carriage.

13. A non-transitory computer-readable storage medium comprising instructions which, when executed by a computer, cause performance of the method of claim 8.

* * * * *